(12) United States Patent
Song et al.

(10) Patent No.: US 7,477,224 B2
(45) Date of Patent: Jan. 13, 2009

(54) LIQUID CRYSTAL DISPLAY

(75) Inventors: Hong Sung Song, Kumi-shi (KR); Sang Chang Yun, Taegu-shi (KR)

(73) Assignee: LG Display Co., Ltd., Seoul (KR)

( * ) Notice: Subject to any disclaimer, the term of this patent is extended or adjusted under 35 U.S.C. 154(b) by 710 days.

(21) Appl. No.: 10/322,770

(22) Filed: Dec. 19, 2002

(65) Prior Publication Data

US 2003/0151584 A1    Aug. 14, 2003

(30) Foreign Application Priority Data

Dec. 19, 2001 (KR) ............................... 2001-81433
Jun. 29, 2002 (KR) ..................... 10-2002-0037740

(51) Int. Cl.
G09G 3/36    (2006.01)

(52) U.S. Cl. ............................... 345/96; 345/90; 345/98

(58) Field of Classification Search ........... 345/87–100, 345/204, 208–210
See application file for complete search history.

(56) References Cited

U.S. PATENT DOCUMENTS

| 5,311,205 | A | * | 5/1994 | Hamada et al. ............... 345/88 |
| 5,436,747 | A | | 7/1995 | Suzuki |
| 5,438,342 | A | | 8/1995 | Yamaguchi |
| 5,745,093 | A | * | 4/1998 | Tsuzuki et al. .............. 345/208 |
| 5,946,068 | A | | 8/1999 | Lee et al. |
| 6,008,801 | A | * | 12/1999 | Jeong ........................ 345/204 |
| 6,160,535 | A | | 12/2000 | Park |
| 6,256,076 | B1 | | 7/2001 | Bae et al. |
| 6,512,505 | B1 | * | 1/2003 | Uchino et al. ................. 345/96 |
| 2002/0089485 | A1 | * | 7/2002 | Youn ............................ 345/99 |
| 2003/0197668 | A1 | * | 10/2003 | Song et al. .................... 345/87 |

FOREIGN PATENT DOCUMENTS

| DE | 19854730 | 9/1999 |
| DE | 10010955 | 9/2000 |
| EP | 0368572 | 5/1990 |
| JP | 9-16132 | 1/1997 |
| JP | 09-016312 | 1/1997 |
| JP | 11-102174 | 4/1999 |
| JP | 2001-42287 | 2/2001 |
| KR | 1999-001493 | 1/1999 |
| KR | 2000-1129 | 1/2000 |

* cited by examiner

*Primary Examiner*—Regina Liang
(74) *Attorney, Agent, or Firm*—McKenna Long & Aldridge LLP

(57) ABSTRACT

A liquid crystal display includes a liquid crystal display panel having liquid crystal cells arranged at crossings of gate lines and data lines and include thin film transistors that are alternately connected to adjacent data lines every 'i' number of horizontal lines (i is a positive number); a gate driver for driving the gate lines; and a data driver for driving the data lines; a multiplexor array for determining an output channel of an inputted pixel data and for adding one blank data in response to the control signals having their polarity inverted every 'i' number of horizontal lines, and a digital-analog converter array for converting the pixel data and the blank data to a pixel signal and a blank signal having their polarities inverted according to the data lines and frames.

9 Claims, 15 Drawing Sheets

| + | − | + | − | + | − | + | − |
|---|---|---|---|---|---|---|---|
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |

FIG.3B
RELATED ART

| − | + | − | + | − | + | − | + |
|---|---|---|---|---|---|---|---|
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |

FIG.4A
RELATED ART

| + | − | + | − | + | − | + | − |
|---|---|---|---|---|---|---|---|
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |

FIG.4B
RELATED ART

| − | + | − | + | − | + | − | + |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

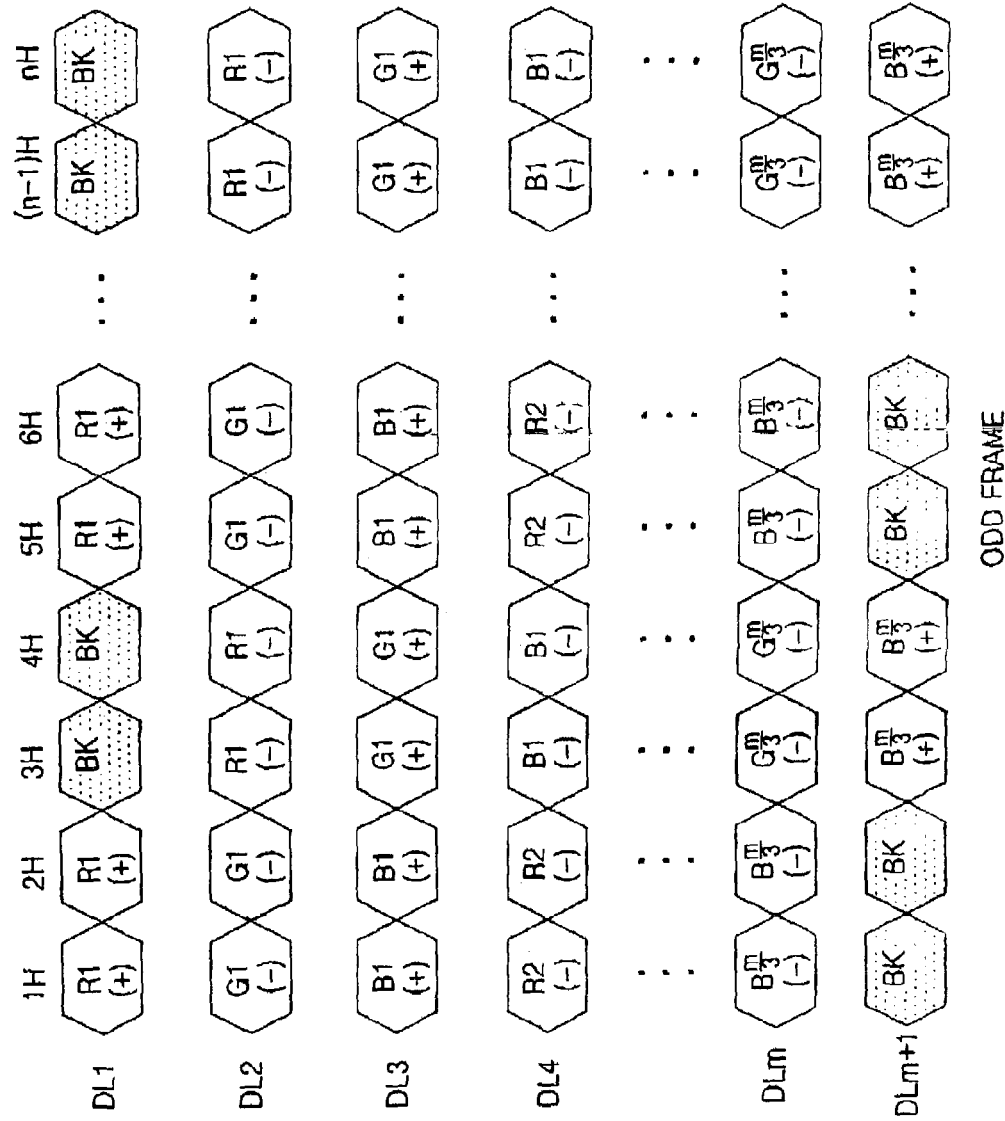

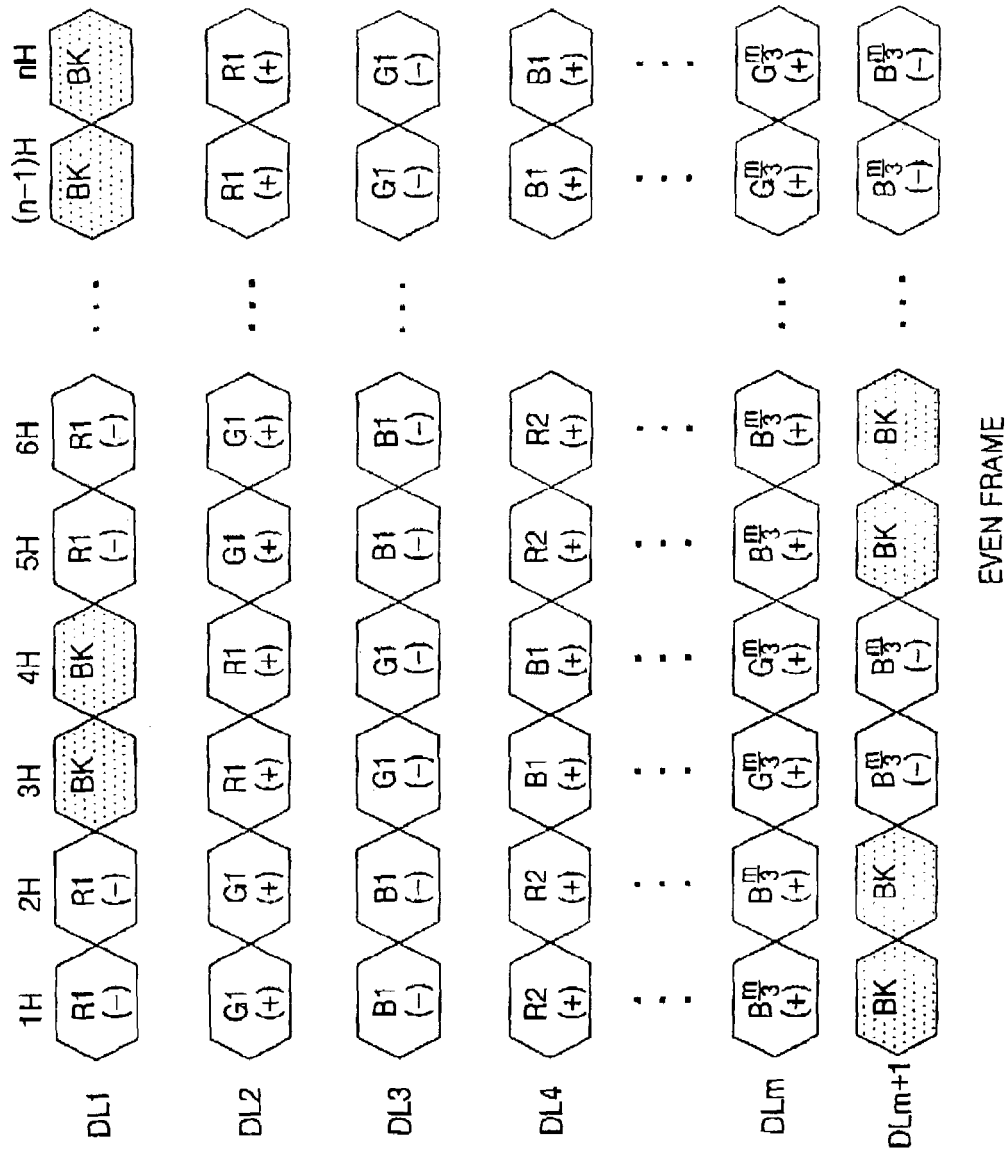

LIQUID CRYSTAL DISPLAY

This application claims the benefit of Korean Patent Application No. 2001-81433, filed on Dec. 19, 2001, which is hereby incorporated by reference for all purposes as if fully set forth herein.

BACKGROUND OF THE INVENTION

1. Field of the Invention

The present invention relates to a liquid crystal display and driving method thereof, and more particularly, to a liquid crystal display that is capable of reducing power consumption and improving its picture quality in addition.

2. Description of the Related Art

Generally, a liquid crystal display (LCD) controls light transmittance of a liquid crystal with dielectric anisotropy using an electric field to display a picture. To this end, the LCD includes a liquid crystal display panel having liquid crystal cells arranged in a matrix type and a driving circuit for driving the liquid crystal display panel.

Liquid crystal cells within the LCD panel control light transmittance in accordance with the pixel signal to display a picture. The driving circuit includes a gate driver for driving the gate lines, a data driver for driving the data lines, a timing controller supplying a timing control signal and pixel data to the gate driver and the data driver, and a power source supplying power.

For instance, as shown in FIG. 1, a liquid crystal display includes a liquid crystal display panel 2 having liquid crystal cells Clc arranged in a matrix type, a gate driver 4 for driving gate lines GL1 to GLn of the liquid crystal display panel 2, and a data driver 6 for driving data lines DL1 to DLm of the liquid crystal display panel 2.

In FIG. 1, the LCD panel 2 includes liquid crystal cells Clc and thin film transistors (TFTs), each of which are provided at a crossing between the n gate lines GL1 to GLn and the m data lines DL1 to DLm. The TFT applies a video signal from the data line DL1 to DLm to the liquid crystal cell Clc in response to a scanning signal from the gate lines GL1 to GLn. The liquid crystal cell Clc can be expressed equivalently as liquid crystal capacitors Clc including a pixel electrode connected to the TFT, a common electrode opposed to the pixel electrode, and liquid crystal between the pixel electrode and the common electrode.

The gate driver 4 sequentially applies a scanning signal to the gate lines GL1 to GLn to drive the TFT connected to a corresponding gate line.

The data driver 6 converts pixel data into analog pixel signals to apply video signals for one horizontal line to the data lines DL1 to DLm during one horizontal period when a gate signal is applied to the gate line GL. In this case, the data driver converts the pixel data into pixel signals with the aid of gamma voltages from a gamma voltage generator (not shown) to supply them.

In order to prevent the deterioration of the liquid crystal and to improve the display quality of the picture, such a liquid crystal display is driven in an inversion driving method such as frame inversion system, line (or column) inversion system or dot inversion system.

In the frame inversion system, polarities of the liquid crystal cells are same within one frame and inverted whenever a frame is changed. Such frame inversion system has a problem that flickers occur by frames.

In the line inversion system, polarities of the liquid crystal cells are inverted by horizontal lines and frames as shown in FIG. 2A and FIG. 2B, respectively. Such a line inversion system has the problem that there may be crosstalk between the liquid crystal cells in a horizontal direction, causing flicker in a horizontal stripe pattern.

In the column inversion system, polarities of the liquid crystal cells are inverted by vertical lines and by frames as shown in FIG. 3A and FIG. 3B, respectively. Such a column inversion driving system has the problem that there may be crosstalk between the liquid crystal cells in a vertical direction, causing flicker in a vertical stripe pattern.

In the dot inversion system, as shown in FIG. 4A and FIG. 4B, the polarities of liquid crystal cells are oppposite to those of the horizontally or vertically adjacent liquid crystal cells and are inverted in each subsequent frame.

In other words, in the dot inversion system, pixel signals are supplied to each liquid crystal cell for their positive(+) polarity and negative(−) polarity to appear alternately as it goes from the left upper liquid crystal cells into the right liquid crystal cells and into the lower liquid crystal cells, as shown in FIG. 4A, at the odd-numbered frames; and pixel signals are supplied to each liquid crystal cell for their negative(−) polarity and positive(+) polarity to appear alternately as it goes from the left upper liquid crystal cells into the right liquid crystal cells and into the lower liquid crystal cells, as shown in FIG. 4B, at the even-numbered frames Such a dot inversion driving system offsets flicker occurring between the adjacent liquid crystal cells in vertical and horizontal directions, thereby providing improved picture quality in comparison to other inversion systems.

However, the dot inversion driving system has a disadvantage in that, because the polarities of the pixel signals applied from the data driver to the data lines should be inverted in the horizontal and vertical directions, a variation in the amount of the pixel signal, that is, the frequency of the pixel signals is larger than in other inversion systems, which causes an increase in power consumption.

SUMMARY OF THE INVENTION

Accordingly, it is an advantage of the present invention to provide a liquid crystal display that is capable of remarkably reducing power consumption and providing improved picture quality in addition.

It is another advantage of the present invention to drive a liquid crystal display panel in an N (herein, N is a positive number) dots inversion system.

Additional features and advantages of the invention will be set forth in the description that follows, and in part, will be apparent from the description, or may be learned by practice of the invention. The objectives and advantages of the invention will be realized and attained by the structure particularly pointed out in the written description and claims hereof as well as the appended drawings.

In order to achieve these and other advantages of the present invention, a liquid crystal display according to one aspect of the present invention includes a liquid crystal display panel having liquid crystal cells defined between crossing gate lines and data lines and alternately connected through thin film transistors to the adjacent data lines, which are different from each other, by i(i is a positive number) horizontal lines; a gate driver for driving the gate lines; and a data driver for driving the data lines and which includes a multiplexor array for determining an output channel of an inputted pixel data and adding one blank data in response to the control signals of which the polarity is inverted by 'i' horizontal lines, and a digital-analog converter array for converting the pixel data and the blank data to a pixel signal and a blank signal of which the polarity is inverted by the data lines and by frames.

In the liquid crystal display, the liquid crystal display panel includes a first horizontal line consisting of the liquid crystal cells connected to the data lines adjacent to the left side thereof; and a second horizontal line consisting of the liquid crystal cells connected to the data lines adjacent to the right side thereof.

In the liquid crystal display, the first horizontal line and the second horizontal line are alternately arranged by the horizontal line.

In the liquid crystal display, the first horizontal line and the second horizontal line are alternately arranged by two horizontal lines.

In the liquid crystal display, the multiplexor array sustains an output channel from the pixel data same as an input channel and supplies the blank data to the last output channel during a first horizontal period when the first horizontal line is driven, and shifts the pixel data by one channel to supply to the output channel and supplies the blank data to the first output channel during a second horizontal period when the first horizontal line is driven.

In the liquid crystal display, the data driver further includes a shift register array supplying a sequential sampling signal; a latch array sequentially latching the pixel data by a specific numbers of channels in accordance with the sampling signal to output and supply them to the multiplexor array at the same time; and a buffer array buffering the pixel signal and the blank signal from the digital-analog converter array to supply them to the data lines respectively.

A liquid crystal display according to another aspect of the present invention includes a liquid crystal display panel having liquid crystal cells defined between crossing gate lines and data lines and alternately connected through thin film transistors to the adjacent data lines, which are different from each other, by i(i is a positive number) horizontal lines; a gate driver for driving the gate lines; a data driver for converting an inputted pixel data and a blank data to pixel signals and blank signals, of which the polarity is inverted by the data line and by the frame, to supply them to the data lines; and a timing controller for controlling the gate driver and the data driver, and at the same time, adding the blank data to any one channel among the first channel or the last channel with the pixel data to supply to the data driver in response to the control signal which is inverted by the i horizontal period.

In the liquid crystal display, the liquid crystal display panel includes a first horizontal line consisting of the liquid crystal cells connected to the data lines adjacent to the left side thereof; and a second horizontal line consisting of the liquid crystal cells connected to the data lines adjacent to the right side thereof.

In the liquid crystal display, the first horizontal line and the second horizontal line are alternately arranged by the horizontal line.

In the liquid crystal display, the first horizontal line and the second horizontal line are alternately arranged by two horizontal lines.

In the liquid crystal display, the timing controller supplying the pixel data and the blank data added as the last channel to the data driver in a first horizontal period for driving the first horizontal line, and supplying the pixel data delayed by one channel and the blank data added to the first channel to the data driver in a second horizontal period for driving the second horizontal line.

The liquid crystal display, the timing controller includes a control signal generator generating control signals which controls the gate driver and the data driver and generating control signals of which the polarity is inverted by the i horizontal period; a pixel data arranger arranging inputted pixel data to output through a plurality of the first buses during a data enable period, and supplying the blank data through the first buses; a delayer for delaying, by one channel, the pixel data and the blank data transmitted through the last bus among the first buses; and a multiplexor supplying, via a plurality of the second buses, the blank data and the data inputted through the first buses, as it is, in response to the control signal or combining the pixel data inputted through the first buses with the blank data delayed by one channel to supply through the second buses.

In the liquid crystal display, the multiplexor supplies, via the second bus, the blank data and the pixel data inputted through the first buses in a first horizontal period for driving the first horizontal line, as it is, and in a second horizontal period for driving the second horizontal line, shifts the pixel data inputted through the first buses, except the last first bus, by one channel to supply through the second buses except the first second bus and supplies the pixel data and the blank data delayed by one channel through the first second bus.

BRIEF DESCRIPTION OF THE DRAWINGS

The accompanying drawings, which are included to provide a further understanding of the invention and are incorporated in and constitute a part of this specification, illustrate embodiments of the invention and, together with description, serve to explain the principles of the invention.

In the drawings:

Figures 2A, 2B:
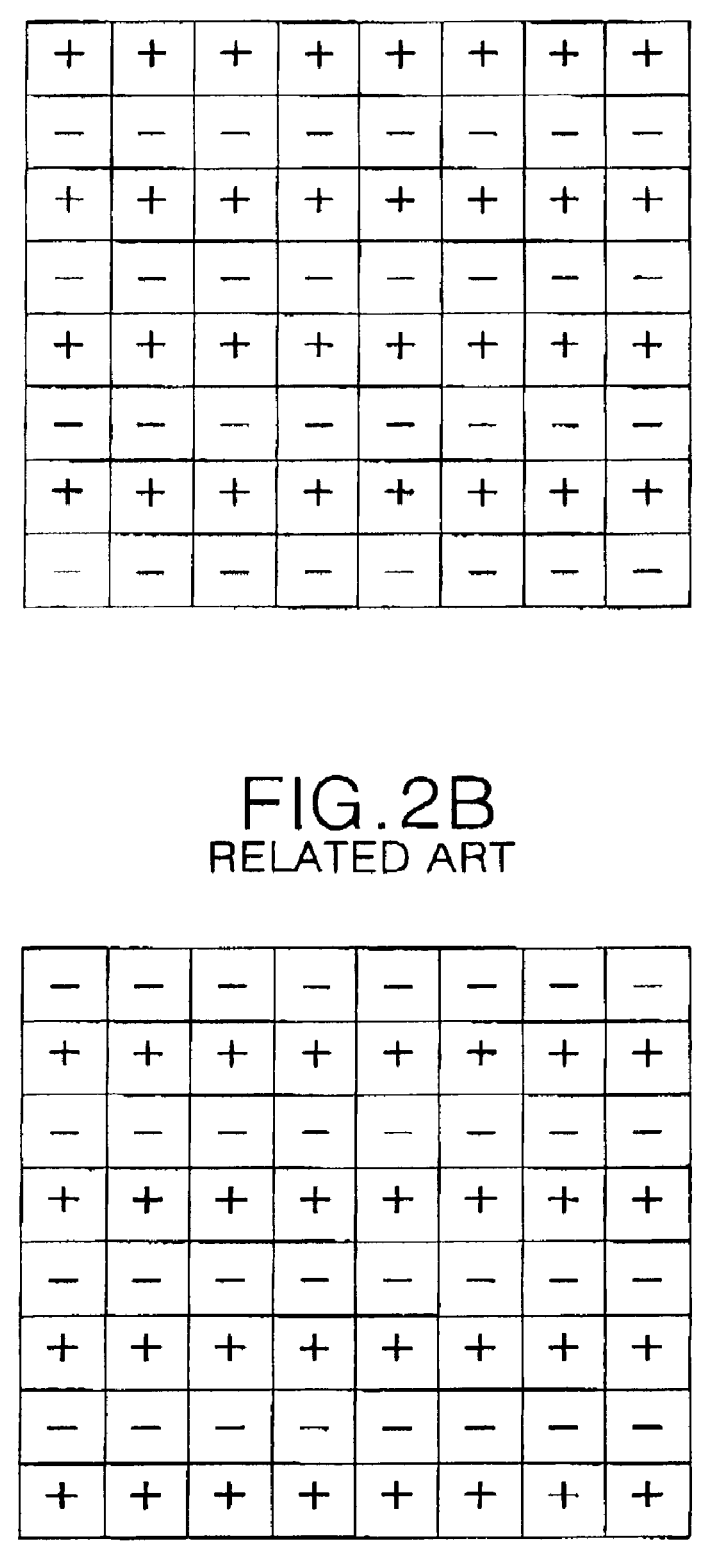

FIG. 2A and FIG. 2B are views for explaining a line inversion driving system of the liquid crystal display;

Figures 3A, 3B:
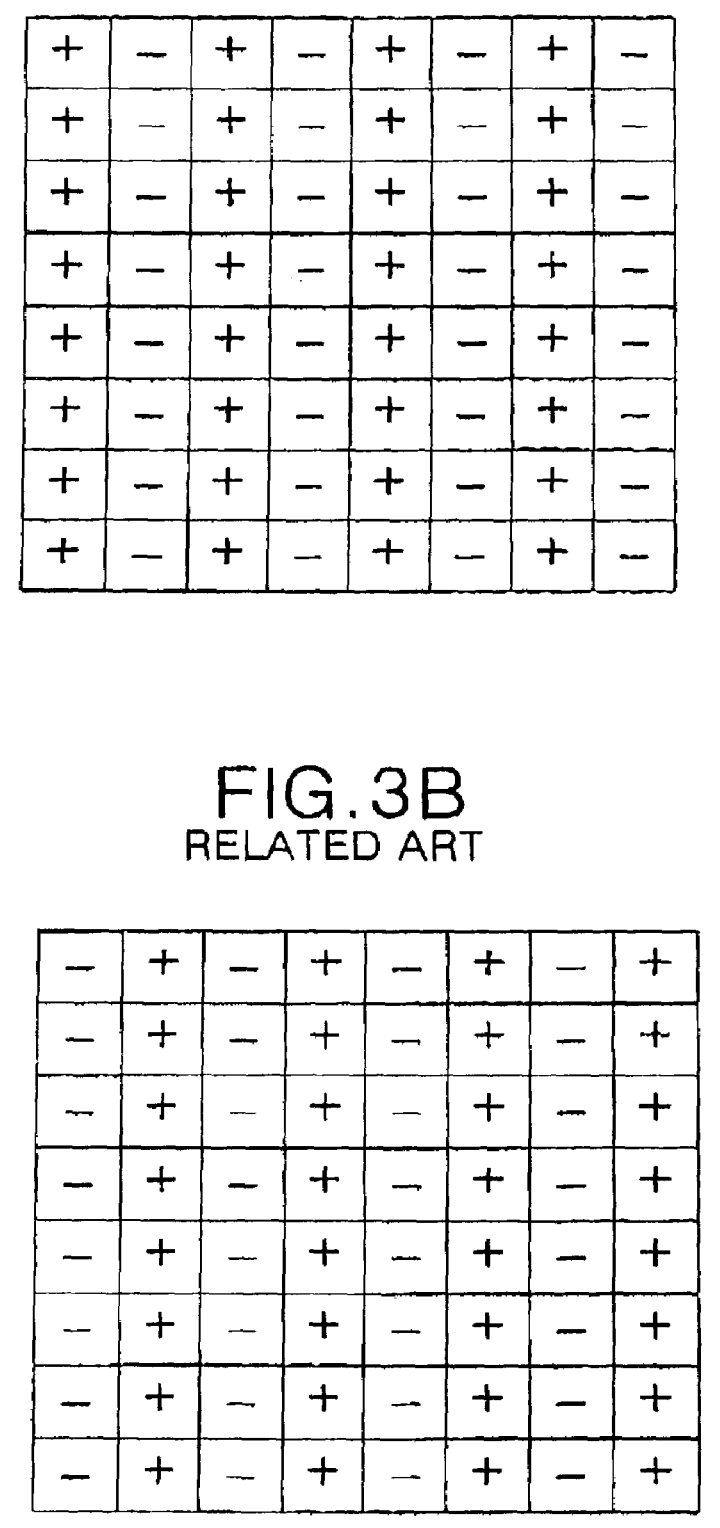

FIG. 3A and FIG. 3B are views for explaining a column inversion driving system of the liquid crystal display;

Figures 4A, 4B:
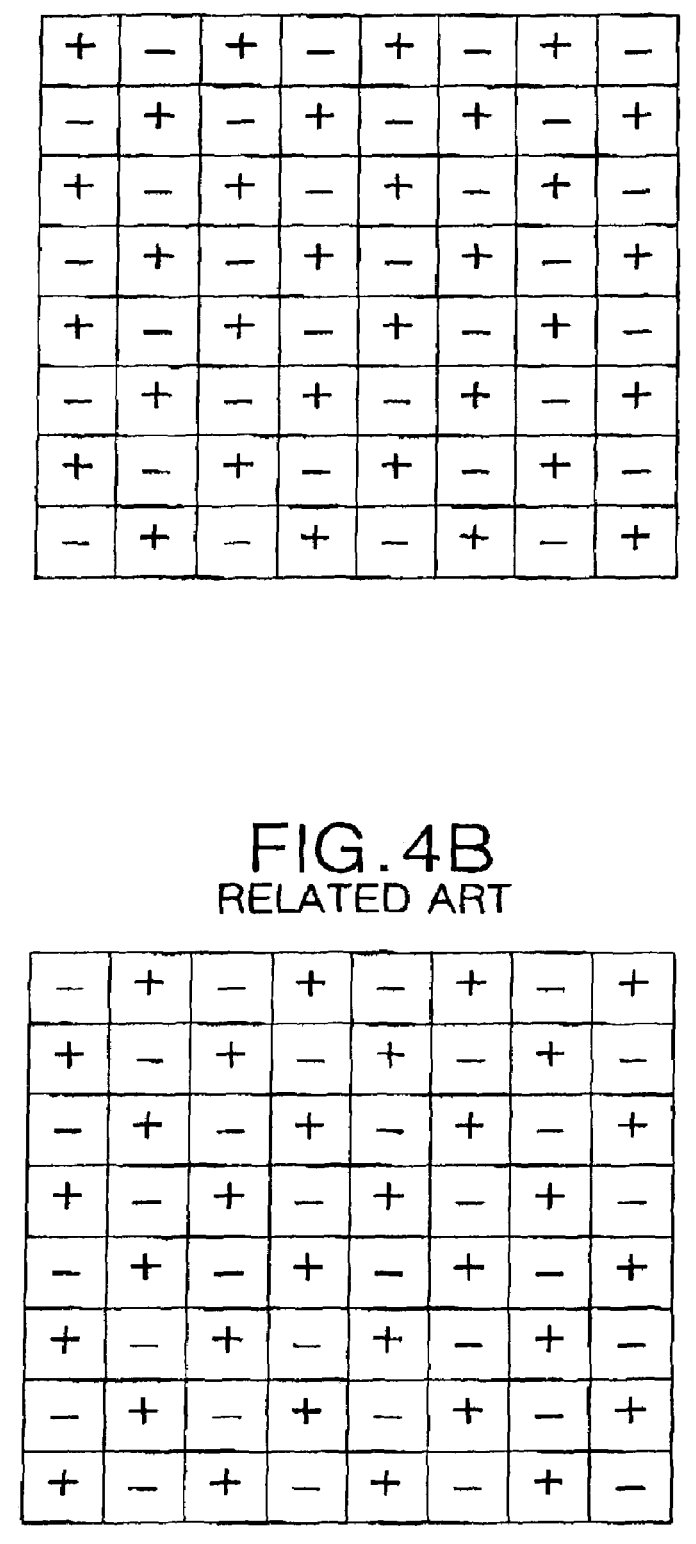

FIG. 4A and FIG. 4B are views for explaining a dot inversion driving system of the liquid crystal display;

FIG. 13A and FIG. 13B are diagrams showing a pixel signal and a blank signal applied to the liquid crystal panel shown in FIG. 11.

DETAILED DESCRIPTION OF THE ILLUSTRATED EMBODIMENTS

Reference will now be made in detail to embodiments of the present invention, examples of which are illustrated in the accompanying drawings.

Figure 1:
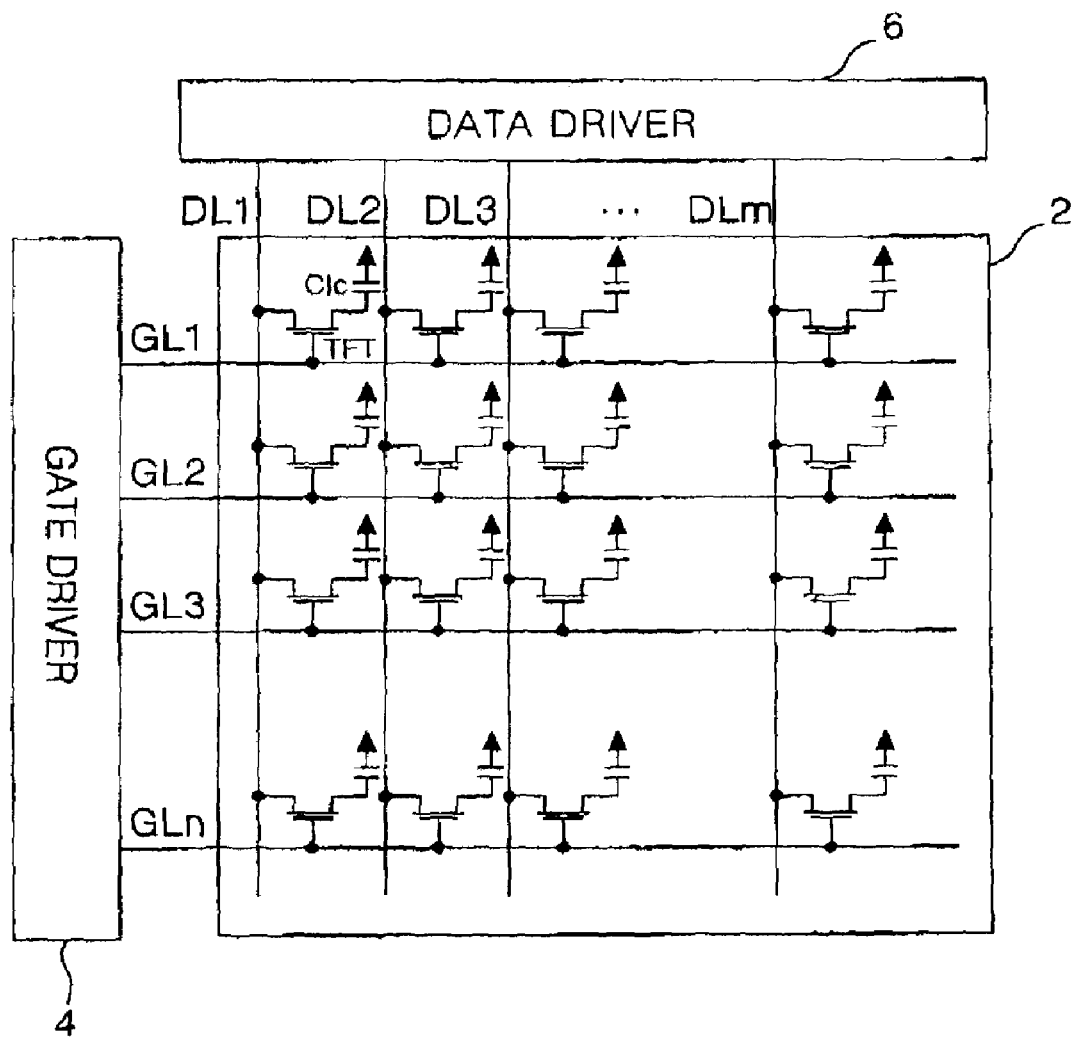
FIG. 1 is a schematic view illustrating a configuration of a conventional liquid crystal display.
Figure 5:
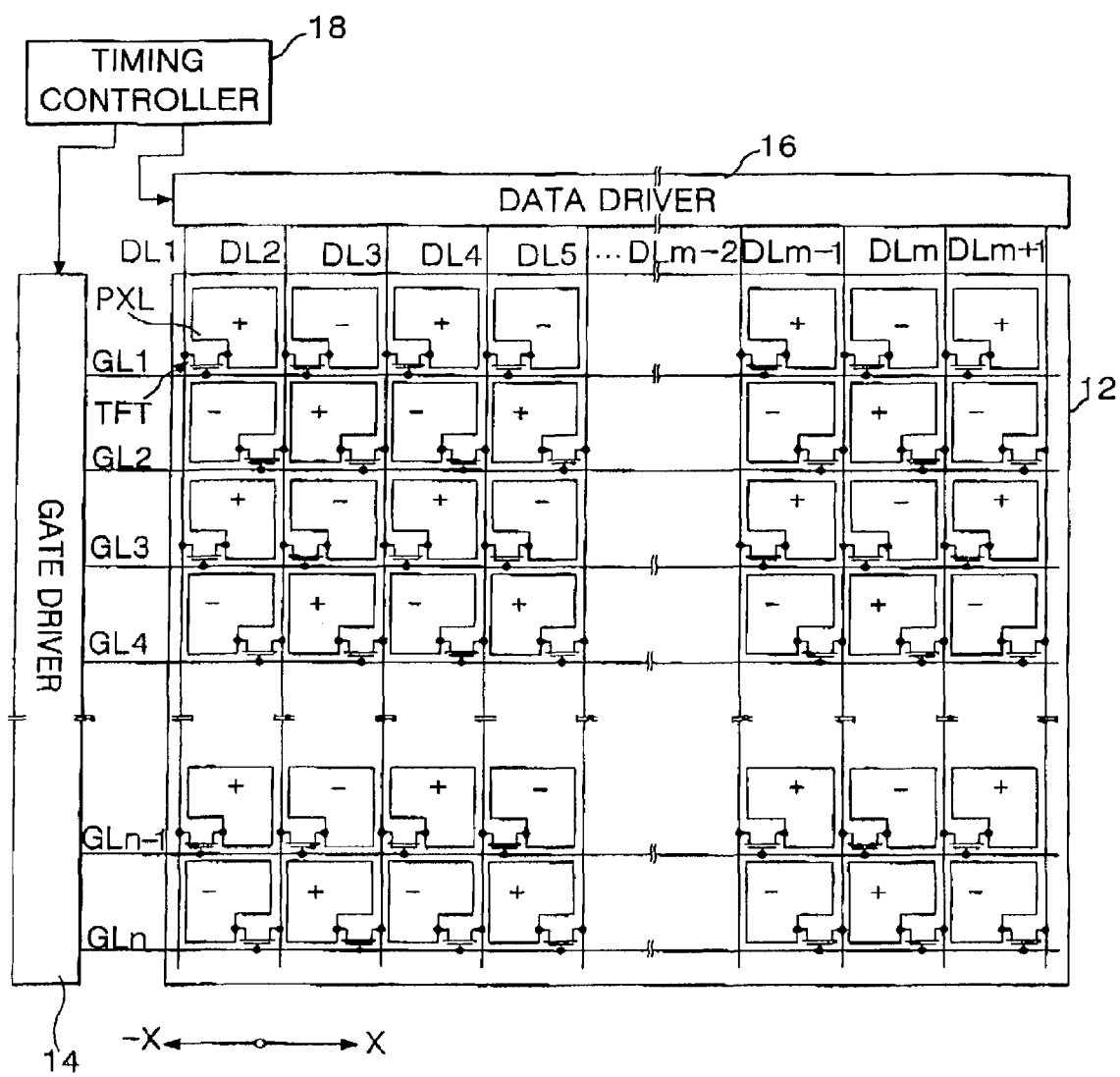
FIG. 5 is a schematic view showing a configuration of a liquid crystal display according to an embodiment of the present invention.

Referring to FIG. 5, there is shown a liquid crystal display according to an embodiment of the present invention.

In one embodiment of the present invention, as shown in FIG. 5 a liquid crystal display includes a liquid crystal display panel 12 having liquid crystal cells PXL arranged in a matrix, a gate driver 14 for driving gate lines GL1 to GLn of the liquid crystal display panel 12, a data driver 16 for driving data lines DL1 to DLm+1 of the liquid crystal display panel 12, and a timing controller 18 for controlling the gate driver 14 and the data driver 16.

The liquid crystal display panel 12 includes N numbers of gate lines GL1 to GLn, and M+1 numbers of data lines DL1 to DLm+1 crossing the gate lines GL1 to GLn and insulated therefrom. The liquid crystal panel 12 includes a liquid crystal cell PXL and a thin film transistor TFT provided at each area defined by crossings between the gate lines GL1 to GLn and the data lines DL1 to DLm+1.

The TFT supplies the pixel signal to the liquid crystal cell PXL from the data lines DL1 to DLm+1 in response to the scanning signal from the gate lines GL1 to GLn. In response to the pixel signal, the liquid crystal cell PXL controls the light transmittance by driving the liquid crystal located between the common and pixel electrodes (not shown).

Specifically, the thin film transistors and the liquid crystal cells PXL are arranged in a zigzag or alternating pattern, where they are located in turn, along the data line DL. In other words, the liquid crystal cells PXL and the TFTs included in the same column are alternately connected to adjacent data lines.

For instance, the TFTs and the liquid crystal cells PXL in the odd-numbered horizontal lines connected to the odd-numbered gate lines GL1, GL3, GL5 . . . are respectively connected to the 1st to mth data lines DL1 to DLm to the left side of each liquid crystal cell, as illustrated in the example of the liquid crystal display panel 12 shown in FIG. 5. Accordingly, the liquid crystal cells PXL on the odd-numbered horizontal lines are charged with the pixel signal via the TFT from the data lines DL adjacent to the left of a respective liquid crystal cells PXL.

On the other hand, the TFTs and the liquid crystal cells PXL on the even-numbered horizontal lines connected to the even-numbered gate lines GL2, GL4, GL6 . . . are respectively connected to the 2nd to (m+1)th data lines DL2 to DLm+1 to the right side of each liquid crystal cell. Accordingly, the liquid crystal cells PXL on the even-numbered horizontal lines are charged with the pixel signal, via the TFT, from the data lines DL adjacent to the right of a respective liquid crystal cell.

Figure 6:
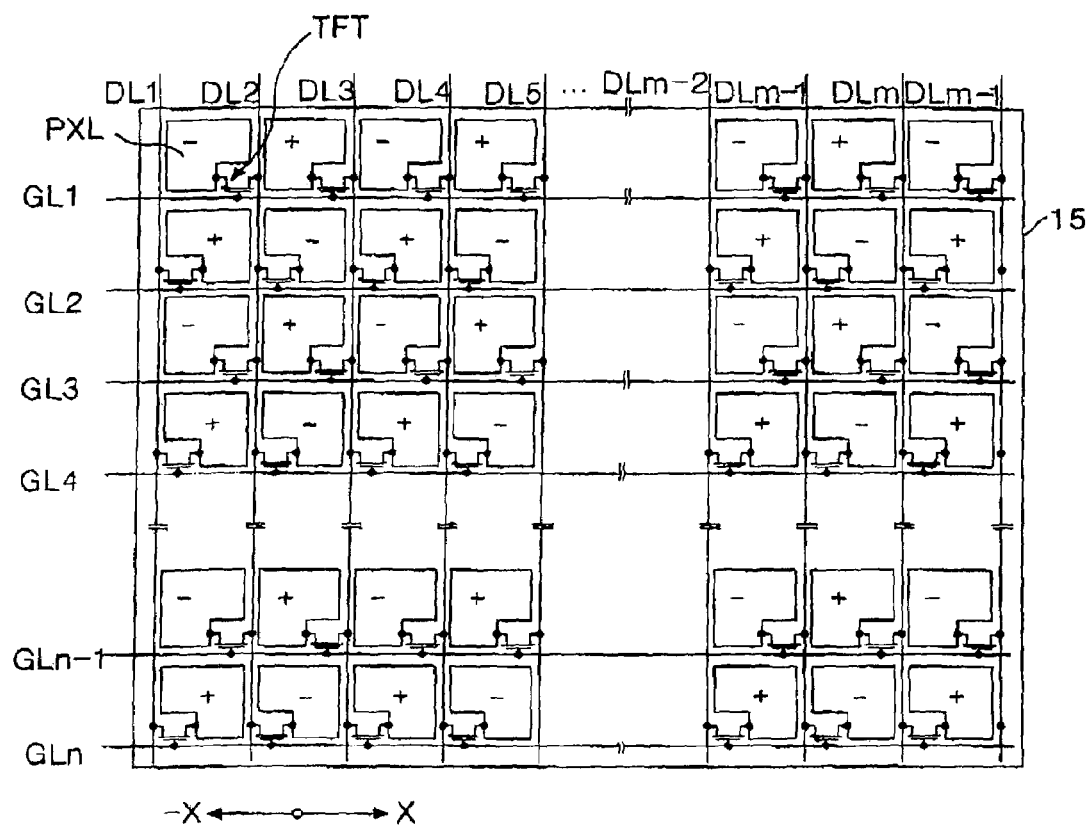
FIG. 6 is a schematic view showing another configuration of the liquid crystal display panel according to the present invention.

Alternatively, as illustrated in FIG. 6, the TFTs and the liquid crystal cells PXL on the odd-numbered horizontal lines connected to the odd-numbered gate lines GL1, GL3, GL5, . . . may be respectively connected to the 2nd to (m+1)th data lines DL2 to DLm+1 adjacent to the right side thereof. Accordingly, the liquid crystal cells PXL on the odd-numbered horizontal lines are charged with the pixel signal, via the TFT, from the data lines DL adjacent to the right side thereof.

The TFTs and the liquid crystal cells PXL on the even-numbered horizontal lines connected to the even-numbered gate lines GL2, GL4, GL6 . . . are respectively connected to the 1st to mth data lines DL1 to DLm adjacent to the left side thereof. Accordingly, the liquid crystal cells PXL on the even-numbered horizontal lines are charged with the pixel signal, via the TFT, from the data lines DL adjacent to the left side thereof.

The timing controller 18 generates timing control signals that control the gate driver 14 and the data driver 16 and supplies pixel data signal to the data driver 16. Gate timing control signals generated at the timing controller 18 include a gate start pulse GSP, a gate shift clock signal GSC, and a gate output enable signal GOE, etc. Data timing control signals generated at the timing controller 18 include a source start pulse SSP, a source shift clock signal SSC, a source output enable signal SOE, and polarity control signal POC, etc.

The gate driver 14 sequentially applies scanning signals to the gate lines GL1 to GLn according to the gate timing control signals. Accordingly, the gate driver 14 drives the thin film transistors by horizontal lines in response to the scanning signal.

The data driver 16 converts the pixel data into analog pixel signals to apply the pixel signals of one horizontal line to the data lines DL1 to DLm+1 by horizontal periods when a scanning signal is applied to the gate line GL. In this case, the data driver 16 converts the pixel data into pixel signals with the aid of gamma voltages supplied by a gamma voltage generator.

Further, the data driver 16 applies the pixel signals according to a column inversion driving system in which the polarity of the pixel signal is inverted in adjacent data lines DL. In other words, the data driver 16 applies pixel signals with opposite polarity to the odd-numbered data lines DL1, DL3, . . . and the even-numbered data lines DL2, DL4, . . . , and the polarity of the pixel signal supplied to the data lines DL is inverted in consecutive frames.

In this case, since the liquid crystal cells PXL are arranged in a zigzag pattern around the data lines DL1 to DLm+1 to which the pixel signal is supplied by the column inversion system, the liquid crystal cells PXL are driven by the dot inversion system.

Particularly, the data driver 16 alternately changes the output channel of the pixel signal by horizontal periods to supply correct pixel signals to the liquid crystal cells PXL arranged in a zigzag pattern along the data lines DL1 to DLm+1.

In case of supplying pixel signals to the liquid crystal cells PXL connected to the right side of the data lines DL1 to DLm+1, the data driver 16 supplies m number of valid pixel signals to the m number of data lines DL1 to DLM and blank signals to the (m+1)th data lines DLm+1. In case of supplying pixel signals to the liquid crystal cells PXL connected to the left side of the data lines DL1 to DLm+1, the data driver 16 supplies m number of valid pixel signals to the 2 to m+1 numbers of data lines DL2 to DLm+1 by shifting them by one channel the right, and blank signals to the 1st data lines DL1.

For instance, when the liquid crystal cells PXL drives odd-numbered horizontal lines connected to the right side of the data lines DL1 to DLm+1, as shown in FIG. 5, the data driver 16 supplies m numbers of valid pixel signals to the $1^{st}$ to $m^{th}$ data lines DL1 to DLm, and blank signals to the $(m+1)^{th}$ data line DLm+1 additionally. When the liquid crystal cells PXL drives even-numbered horizontal lines connected to the left side of the data lines DL1 to DLm+1, the data driver 16 supplies m numbers of valid pixel signals to the $2^{nd}$ to $(m+1)^{th}$ data lines DL2 to DLm+1 by shifting them by one channel toward the right, and blank signals to the $1^{st}$ data line.

Differently from this, when the liquid crystal cells PXL drives odd-numbered horizontal lines connected to the left side of the data lines DL1 to DLm+1, as shown in FIG. 6, the data driver 16 supplies m numbers of valid pixel signals to the $2^{nd}$ to $(m+1)^{th}$ data lines DL2 to DLm+1 by shifting them by one channel toward the right, and blank signals to the 1$^{st}$ data line. When the liquid crystal cells PXL drives even-numbered horizontal lines connected to the left side of the data lines DL1 to DLm+1, the data driver 16 supplies m numbers of valid pixel signals to the 1$^{st}$ to m$^{th}$ data lines DL1 to DLm, and blank signals to the (m+1)$^{th}$ data line DLm+1 additionally.

Accordingly, the picture quality is improved by the liquid crystal cells PXL driven in the dot inversion system, and since the data driver 16 supplies pixel signals by the column inversion system, its power consumption is remarkably reduced in comparison to when the pixel signals are supplied by the dot inversion system.

Figure 7:
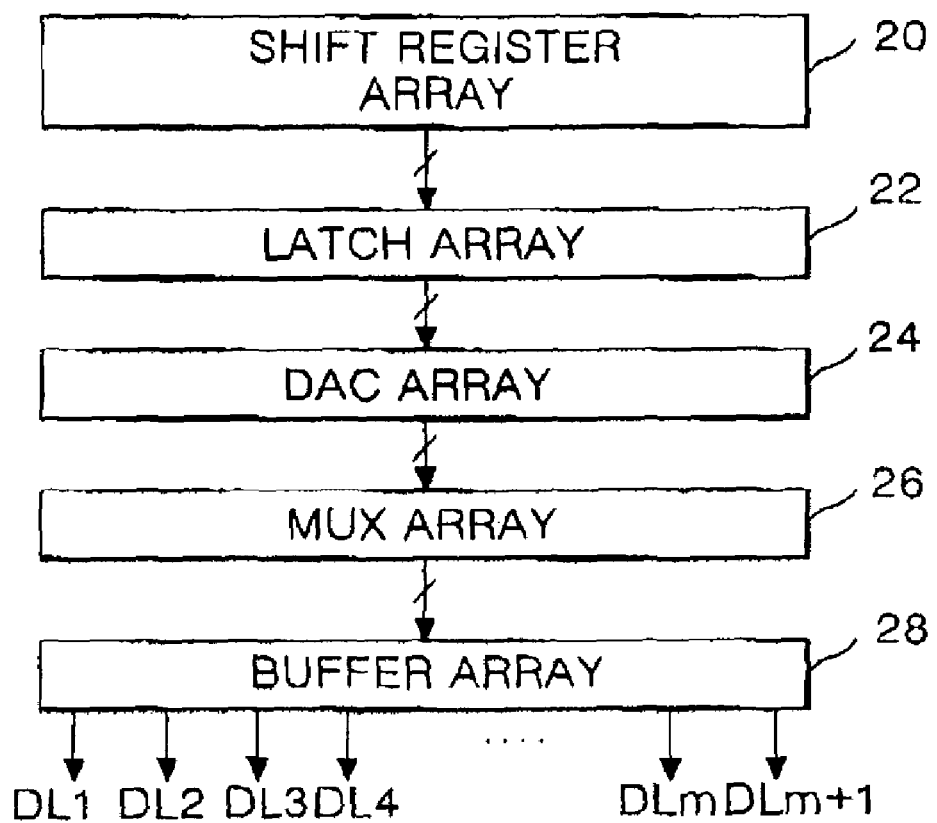
FIG. 7 is a detailed block diagram showing a configuration of the data driver shown in FIG. 5.

FIG. 7 is a block diagram illustrating a detailed configuration of the data driver 16 shown in FIG. 5.

Referring to FIG. 7, the data driver 16 includes a shift register array 20 for applying sequential sampling signals, a latch array 22 for latching and outputting pixel data in response to the sampling signals, a multiplexor (MUX) array 24 that determines the route of pixel data inputted from the latch array 22, a digital to analog converter (DAC) array 26 for converting the pixel data from the MUX array 24 into analog pixel signals, a buffer array 28 for buffering and outputting the pixel signals from the DAC array 26.

A plurality of shift registers included in the shift register array 22 sequentially shift an source start pulse SSP from the timing controller 18 in response to a source sampling clock signal SSC to output it as a sampling signal.

A plurality of latches included in the latch array 22 sequentially latch pixel data from the timing controller 18 by a certain unit in response to the sampling signal from the shift register array 20. Then the latch array 22 simultaneously outputs the latched pixel array in response to a source output enable signal (SOE) from the timing controller 18.

The MUX array 24 selects the route of the pixel data from the latch array 22 by horizontal periods in response to the control signal from the timing controller 18. Particularly, the MUX array 24 outputs the inputted pixel data without the change of channel during odd-numbered (or even-numbered) horizontal periods when driving the liquid crystal cells PXL connected to the data lines DL1 to DLm+1 to the right and has blank data supplied to the last channel. Differently from this, the MUX array 24 outputs the inputted pixel data by shifting one channel to the right during even-numbered (or odd-numbered) horizontal periods when driving the liquid crystal cells PXL connected the data lines DL1 to DLm+1 to the left and has blank data supplied to the first channel.

For this, the MUX array 24 includes m numbers of MUX, and each of the MUXs receives two adjacent latches to selectively output in accordance with the control signal from the timing controller 18. Herein, except the first and the m$^{th}$ latches among a polarity of latches, the outputs of the other latches are shared by two adjacent MUXs. The control signal supplied to the MUX array 24 is inverted in polarity in consecutive horizontal periods.

A plurality of digital-to-analog converters DACs included in the DAC array 26 convert the pixel data and the blank data from the MUX array 24 into pixel signals and blank signals with the aid of positive and negative gamma voltages from a gamma voltage generator (not shown). Particularly, the DAC array 26 converts the odd-numbered and even-numbered pixel data into pixel signals with an opposite polarity to output them to perform column inversion drive in response to the polarity control signal POL from the timing controller 18.

The buffer array 28 buffers the pixel signals and the blank signals from the DAC array 26 and then outputs them to the data lines DL1 to DLm+1.

Accordingly, pixel signals, the polarities of which are inverted by data lines and by frames, are supplied to the data lines DL1 to DLm+1. The valid pixel signals are supplied to the 1$^{st}$ to m$^{th}$ data lines DL1 to DLm, and the blank signals to the m+1$^{th}$ data line DLm+1 during the odd-numbered (or even-numbered) horizontal periods. The blank signals are supplied to the 1$^{st}$ data line DL1, and the valid pixel signals to the 2$^{nd}$ to m+1$^{th}$ data line DL2 to DLm+1 during even-numbered (or the odd-numbered) horizontal periods. Subsequently, the liquid crystal cells arranged in the zigzag pattern along the data lines DL1 to DLm+1 can be driven by the dot inversion system. As a result, since the data driver 16 is driven by the column inversion system and the liquid crystal cells are driven by the dot inversion system, the power consumption can be remarkably reduced.

Figure 8:
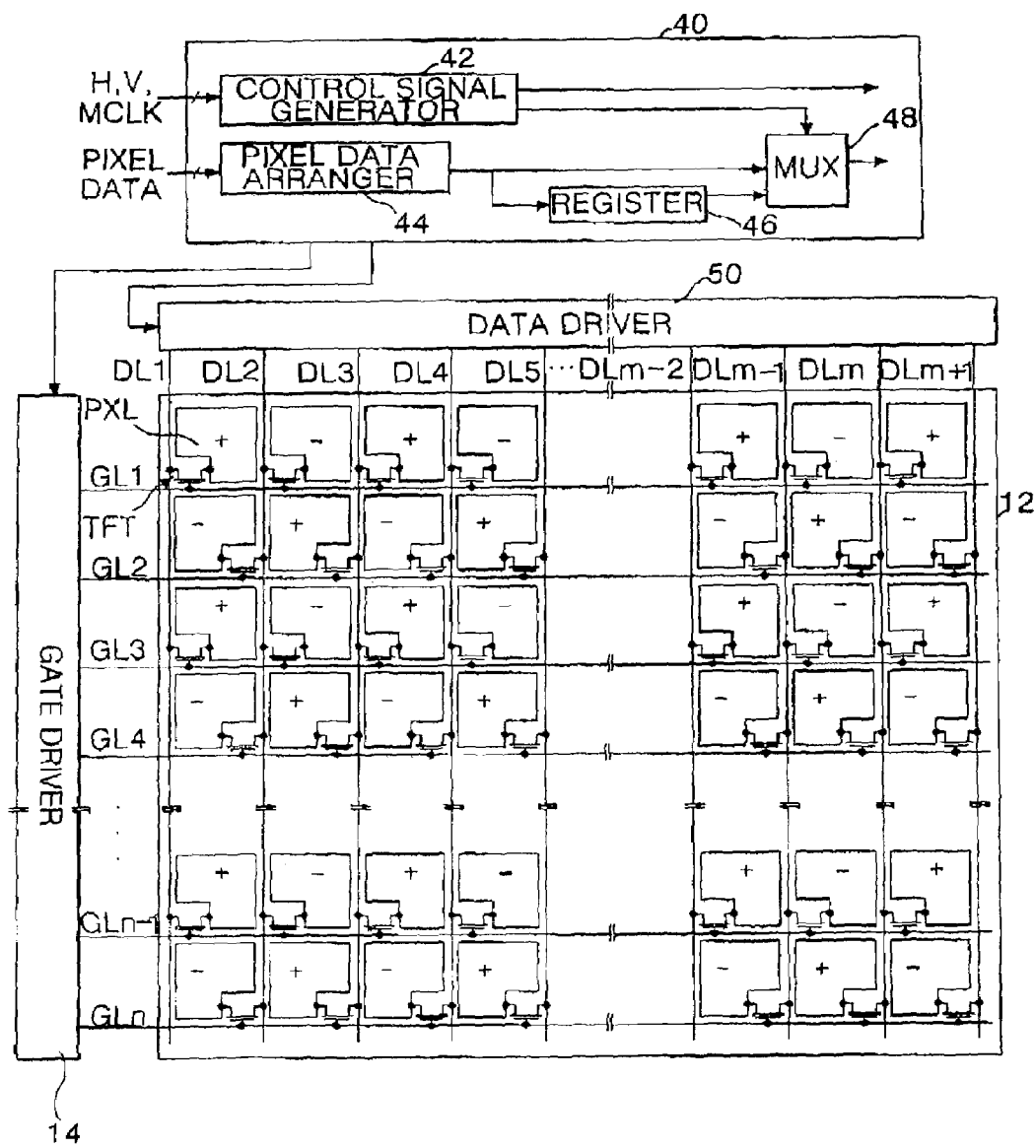
FIG. 8 is a schematic view illustrating a configuration of a liquid crystal display according to another embodiment of the present invention.

FIG. 8 represents a liquid crystal display according to another embodiment of the present invention.

The liquid crystal display, shown in FIG. 8, has the same elements as the liquid crystal display shown in FIG. 7, except that there is difference in the function of the timing controller 40 and the data driver 50.

The liquid crystal display 12 has the liquid crystal cells PXL and the TFTs provided at each area defined by crossing between the gate lines GL1 to GLn and the data lines DL1 to DLm+1 to be arranged in a matrix pattern.

The TFTs and the liquid crystal cells PXL are arranged in a zigzag pattern, where their position takes turns right to left or vice versa, along the data lines DL1 to DLm+1. In other words, the liquid crystal cells and TFTs included in the same column are alternately connected to adjacent data lines by horizontal lines.

For instance, the liquid crystal cells PXL and the TFTs of the odd-numbered or (even-numbered) horizontal lines are connected to the 1$^{st}$ to m$^{th}$ data lines DL1 to DLm to the left, respectively. On the other hand, the liquid crystal cells PXL and the TFTs of the even-numbered horizontal lines are connected to the 2$^{nd}$ to (m+1)$^{th}$ data lines DL2 to DLm+2 to the right thereof, respectively.

The gate driver 14 sequentially applies scanning signals to the gate lines GL1 to GLn in use of gate timing control signals from the timing controller 40. Accordingly, the gate driver 14 drives the TFTs by horizontal lines in response to the scanning signals.

The data driver 50 converts the inputted pixel data into analog pixel signals to be applied to the data lines DL1 to DLm+1 by horizontal lines when the scanning signals are applied to the gate line GL. In this case, the data driver 50 converts the pixel data into pixel signals with the aid of gamma voltages from a gamma voltage generator (not shown) to supply them.

Further, the data driver 50 applies the pixel signals by a column inversion driving system where the pixel signals are inverted by data lines DL1 to DLm+1. In other words, the data driver 50 applies pixel signals with opposite polarity to the odd-numbered data lines DL1, DL3, . . . and the even-numbered data lines DL2, DL4, . . . , the polarity of the pixel signals supplied to the data lines DL1 to Dlm+1 is inverted by frames. In this case, because the liquid crystal cells PXL arranged in a zigzag pattern on the basis of the data lines DL1 to DLm+1 to which the pixel signals are supplied in the column inversion driving system, the liquid crystal cells are driven by the dot inversion system.

Specifically, to supply accurate pixel signals to the liquid crystal cells PXL arranged in the zigzag pattern along the data lines DL1 to DLm+1, the data driver 50 supplies the blank signals to the 1$^{st}$ data line DL1 and the valid pixel signals to the 2$^{nd}$ to (m+1)$^{th}$ data lines DL2 to DLm+1 in the odd-numbered (or even-numbered) horizontal period. The valid pixel signals are supplied to the $1^{st}$ to $m^{th}$ data lines DL1 to DLm, and the blank signals to the $(m+1)^{th}$ data line DLm+1 in the even-numbered (or odd-numbered) horizontal period.

The timing controller 40 generates control signals for controlling the driving of the gate driver 14 and the data driver 50 and applies a pixel data to the data driver 50.

Gate timing control signals generated at the timing controller 40 includes gate start pulse GSP, gate shift clock signal GSC, and gate output enable signal GOE, etc. The data timing control signals generated at the timing controller 40 includes source start pulse SSP, source shift clock signal SSC, source output enable signal SOE, and polarity control signal POL, etc.

Particularly, the timing controller 40 supplies m numbers of pixel data of one horizontal line sequentially by a certain unit in the odd-numbered (or even-numbered) horizontal period and additionally the blank data are supplied as $(m+1)^{st}$ pixel data. In the even-numbered (or odd-numbered) horizontal period, the m numbers of pixel data are supplied with delay (e.g., shifted to the right) by one channel and additionally blank signals are supplied as the first pixel data.

For the sake of such a driving, the timing controller 40 includes a control signal generator 42 for generating control signals, a pixel data arranger 44 for arranging and outputting input pixel data, a register 46 for delaying the last pixel data of the pixel data outputted from the pixel data arranger 44, and a MUX 48 for selectively combining the pixel data from the pixel data arranger 44 and the pixel data delayed from the register 46.

The control signal generator 42 generates gate timing control signals for controlling the gate driver 14 and data timing control signals for controlling the data driver 50 in use of horizontal synchronization signal H, vertical synchronization signal 9, main clock signal MCLK etc. Further, the control signal generator 42 generates a MUX 48 control signal. In case of this, the control signal generator 42, in use of the horizontal synchronization signal H, generates the control signal indicating the odd-numbered horizontal period and the even-numbered horizontal period, that is, of which the polarity is inverted by horizontal period so as to supply it to the MUX 48.

The pixel data arranger 44 arranges input pixel data and outputs the pixel depending upon a data transmission bus hierarchy. For instance, the pixel data arranger 44 simultaneously outputs the pixel data of R, G and B through three buses, or simultaneously outputs the pixel data of odd-numbered R, G and B and the pixel data of even-numbered R, G and B through six buses. The pixel data outputted through the other buses excluding the last bus among such buses are supplied to the MUX 48, and the pixel data outputted through the last bus are commonly supplied to the MUX 48 and the register 46. Also, the pixel data arranger 44 takes samples of the blank data BK in a blank interval between data enable intervals to output the blank in the data enable interval.

The register 46 temporarily stores the pixel data transmitted via the last bus of the pixel data outputted from the pixel data arranger 44 and delays outputting it by one channel.

The MUX 48 outputs m numbers of the pixel data and the blank data, $(m+1)^{th}$ data, inputted through three buses or six buses from the pixel data arranger 44 in the odd-numbered (or even-numbered) horizontal periods in response to the control signal.

Also, in response to the control signal, MUX 48 shifts to output the pixel data inputted via the first or the second bus from the pixel data arranger 44 to the second or the third bus in the even-numbered (or odd-numbered) horizontal period.

Or, it shifts to output the pixel data inputted through the first to the fifth bus to the second to sixth bus.

The pixel data of the last bus, that is, the third or the sixth bus, which the register 46 delays by one channel, is output to the first bus. In case of this, the blank data stored at the register 46 during the blank interval are supplied as the first data of the first bus in the even-numbered (or odd-numbered) horizontal interval.

Figure 9A:
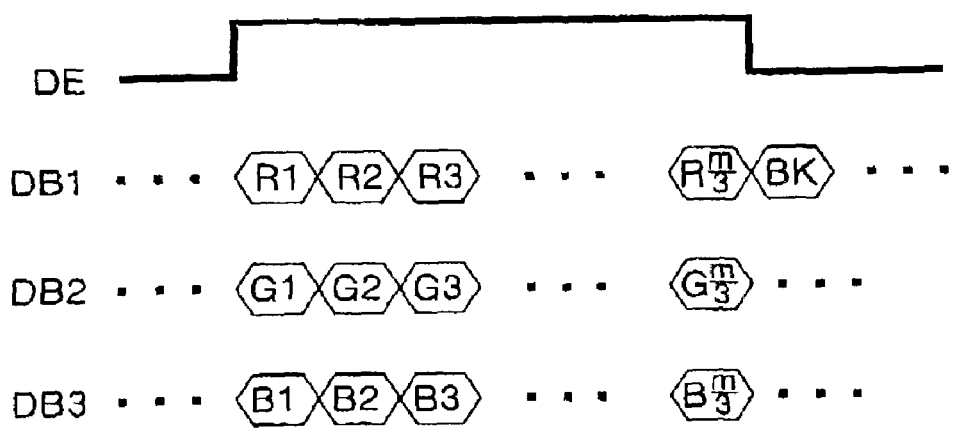
FIG. 9A and FIG. 9B are waveform diagrams of a data output of three bus system of the timing controller shown in FIG. 8.
Figure 9B:
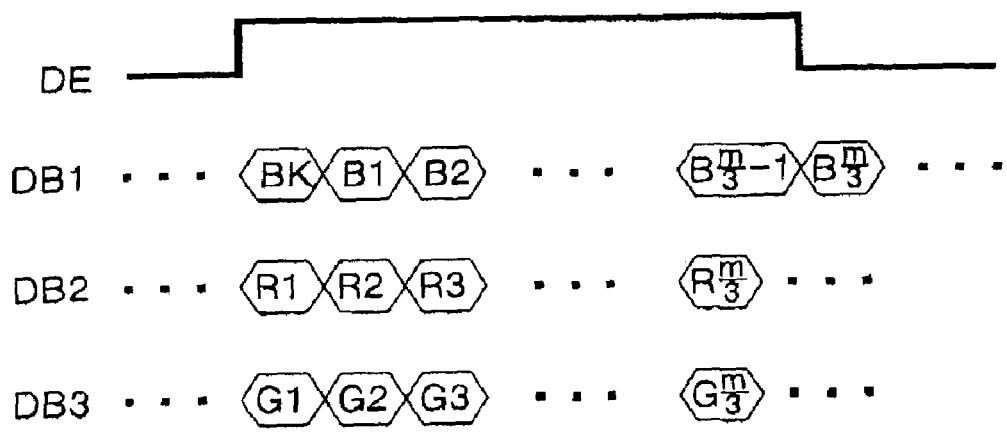

FIG. 9A and FIG. 9B are timing charts of blank data and pixel data supplied from the timing controller 40, via the three buses, to the data driver 50 in the odd-numbered (or even-numbered) horizontal period and even-numbered (or odd-numbered) horizontal period.

Referring to FIG. 9A, the timing controller 40, in the odd-numbered (or even-numbered) horizontal period, supplies one blank data BK and m/3 numbers of red pixel data R1, R2, R3, ..., Rm/3 via the first bus DB1 to the data driver 50, m/3 numbers of green pixel data G1, G2, G3, ..., Gm/3 via the second bus DB2, and m/3 numbers of blue pixel data B1, B2, B3, ..., Bm/3 via the third bus DB3. In this way, the timing controller 40 supplies m numbers of the valid pixel data R, G and B to the data driver 50 through the first to the third bus DB1 to DB3 during the enable interval of the data enable signal DE. The timing controller 40 supplies the blank data BK sequentially following the enable period.

Accordingly, the data driver 50 inputs one blank data BK and m numbers of valid pixel data R, G and B from the timing controller 40. The data driver 50 converts the inputted m numbers of valid pixel data R, G and B to analog pixel signals to supply to the first to $m^{th}$ data lines DL1 to DLm, and, at the same time, converts one blank data BK to an analog blank signal to supply to the $(m+1)^{th}$ data line DLm+1.

Referring to FIG. 9B, the timing controller 40, in the even-numbered (or odd-numbered) horizontal period, supplies m/3 numbers of red pixel data R1, R2, R3, ..., Rm/3 to the data driver 50 by shifting them to the second bus DB2, and m/3 numbers of green pixel data G1, G2, G3, ..., Gm/3 by shifting them to the third bus DB3. The timing controller 40 supplies to the data driver 50, via the first bus DB1, m/3 numbers of blue pixel data B1, B2, B3, ..., Bm/3 and one blank data BK delayed by one channel. In this way, the timing controller 40 supplies one blank data BK and m−1 numbers of the valid pixel data R, G and B, which is shifted by one channel, to the data driver 50 through the first to the third bus DB1 to DB3 during the enable interval of the data enable signal DE. The timing controller 40 further supplies the last valid pixel data Dm/3, which is shifted by one channel, sequentially following the enable period.

Accordingly, the data driver 50 inputs one blank data BK and m numbers of valid pixel data R, G and B from the timing controller 40. The data driver 50 converts the inputted m numbers of valid pixel data R, G and B, which is shifted by one channel, to analog pixel signals to supply to the second to $(m+1)^{th}$ data lines DL2 to DLm+2 and at the same time converts one blank data BK to an analog blank signal to supply to the first data line DL1.

Figure 10A:
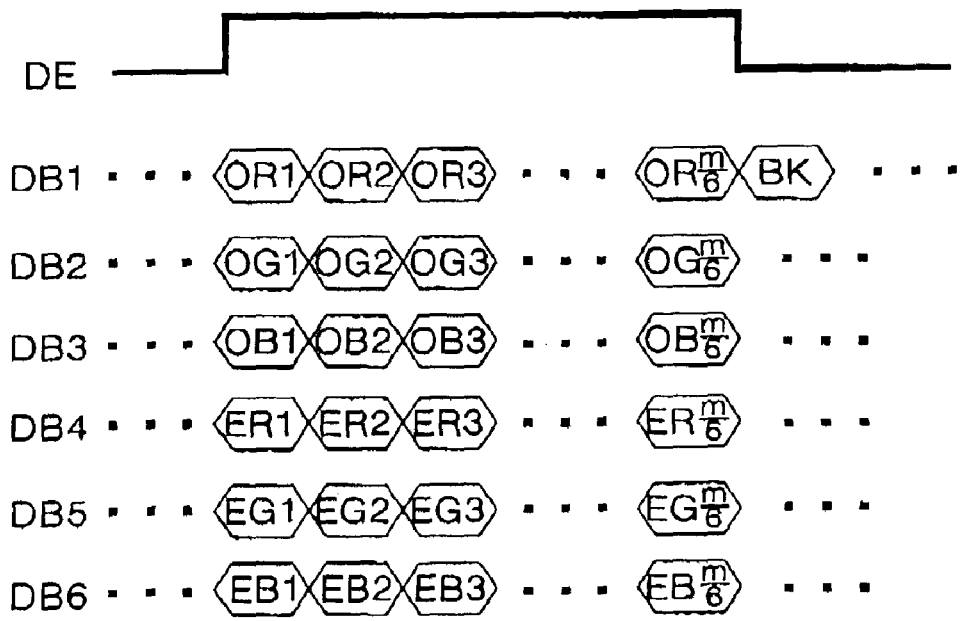
FIG. 10A and FIG. 10B are waveform diagrams of a data output of six bus system of the timing controller shown in FIG. 8.
Figure 10B:
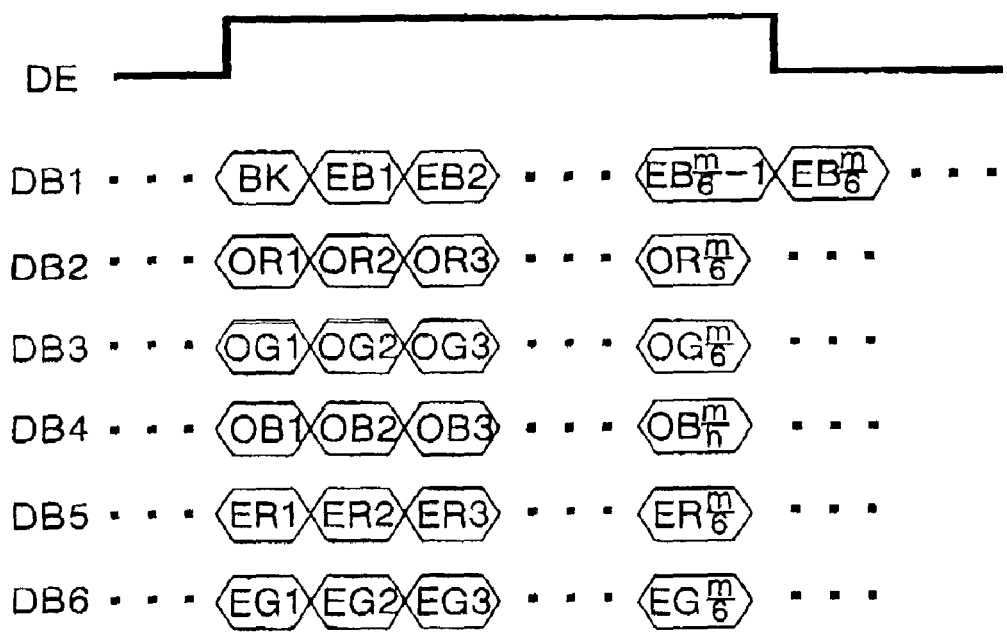

FIG. 10A and FIG. 10B are timing charts of blank data and pixel data supplied from the timing controller 40, via the six buses, to the data driver 50 in the odd-numbered (or even-numbered) horizontal period and even-numbered (or odd-numbered) horizontal period.

Referring to FIG. 10A, the timing controller 40, in the odd-numbered (or even-numbered) horizontal period, supplies one blank data BK and m/6 numbers of odd-numbered red pixel data OR1, OR2, OR3, ..., ORm/6 via the first bus DB1 to the data driver 50; m/6 numbers of odd-numbered green pixel data OG1, OG2, OG3, ..., OGm/6 via the second bus DB2; m/6 numbers of odd-numbered blue pixel data OB1, OB2, OB3, . . . , OBm/6 via the third bus DB3; m/6 numbers of even-numbered red pixel data ER1, ER2, ER3, . . . , ERm/6 via the fourth bus DB4; m/6 numbers of even-numbered green pixel data EG1, EG2, EG3, . . . , EGm/6 via the fifth bus DB5; and m/6 numbers of even-numbered blue pixel data EB1, EB2, EB3, . . . , EBm/6 via the sixth bus DB6.

In this way, the timing controller 40 supplies m numbers of the valid pixel data R, G and B to the data driver 50 through the first to the sixth bus DB1 to DB6 during the enable interval of the data enable signal DE. The timing controller 40 supplies the blank data BK sequentially following the enable period.

Accordingly, the data driver 50 inputs one blank data BK and m numbers of valid pixel data R, G and B. The data driver 50 converts the m numbers of valid pixel data R, G and B to analog pixel signals to supply to the first to $m^{th}$ data lines DL1 to DLm and at the same time converts one blank data BK to an analog blank signal to supply to the $(M+1)^{th}$ data line DLm+1.

Referring to FIG. 10B, the timing controller 40, in the even-numbered (or odd-numbered) horizontal period, supplies m/6 numbers of odd-numbered red pixel data OR1, OR2, OR3, . . . , ORm/6 to the data driver 50 by shifting them to the second bus DB2; m/6 numbers of odd-numbered green pixel data OG1, OG2, OG3, . . . , OGm/3 to the third bus DB3; m/6 numbers of odd-numbered blue pixel data OB1, OB2, OB3, . . . , OBm/6 to the fourth bus DB4; m/6 numbers of even-numbered red pixel data ER1, ER2, ER3, . . . , ERm/6 to the fifth bus DB5; and m/6 numbers of even-numbered green pixel data EG1, EG2, EG3, . . . , EGm/6 to the sixth bus DB6.

The timing controller 40 supplies to the data driver 50, via the first bus DB1, m/6 numbers of even-numbered blue pixel data EB1, EB2, EB3, . . . , EBm/6 and one blank data BK delayed by one channel. In this way, the timing controller 40 supplies one blank data BK, which is shifted by one channel, and m−1 numbers of the valid pixel data R, G and B to the data driver 50 through the first to the sixth bus DB1 to DB6 during the data enable interval. The timing controller 40 further supplies the last valid pixel data Dm/6, which is shifted by one channel, sequentially following the enable period.

Accordingly, the data driver 50 inputs one blank data BK and m numbers of valid pixel data R, G and B. The data driver 50 converts the inputted m numbers of valid pixel data R, G and B, which are shifted by one channel, to analog pixel signals to supply to the second to $(m+1)^{th}$ data lines DL2 to DLm+2, and, at the same time, converts one blank data BK to an analog blank signal to supply to the first data line DL1.

Likewise, blank data (of the first or the last pixel data) are supplied along with the m numbers of valid pixel data by horizontal periods in the timing controller 40. The data driver 50 converts m numbers of valid pixel data and one blank data to analog pixel signals and blank signals of the column inversion system to supply them to the liquid crystal panels 12 and 15. As a result, the liquid crystal panels 12 and 15 are driven in the dot inversion system.

On the other hand, when the liquid crystal panels 12 and 15 are driven in the dot inversion system, flicker occurs if a specific dot pattern, which is displayed upon Window Shut Down. This is because other patterns have the frequency of 60 Hz, the vertical driving frequency, contrary the specific dot pattern, which has the frequency of 30 Hz, so that flicker occurs of 30 Hz frequency. To prevent this flicker, the frequency of flicker is made to be 60 Hz by adopting the vertical two-dot inversion system. In this case, the frequency of the flicker becomes identical to the vertical driving frequency so that a human being is unable to perceive the flicker.

Figure 11:
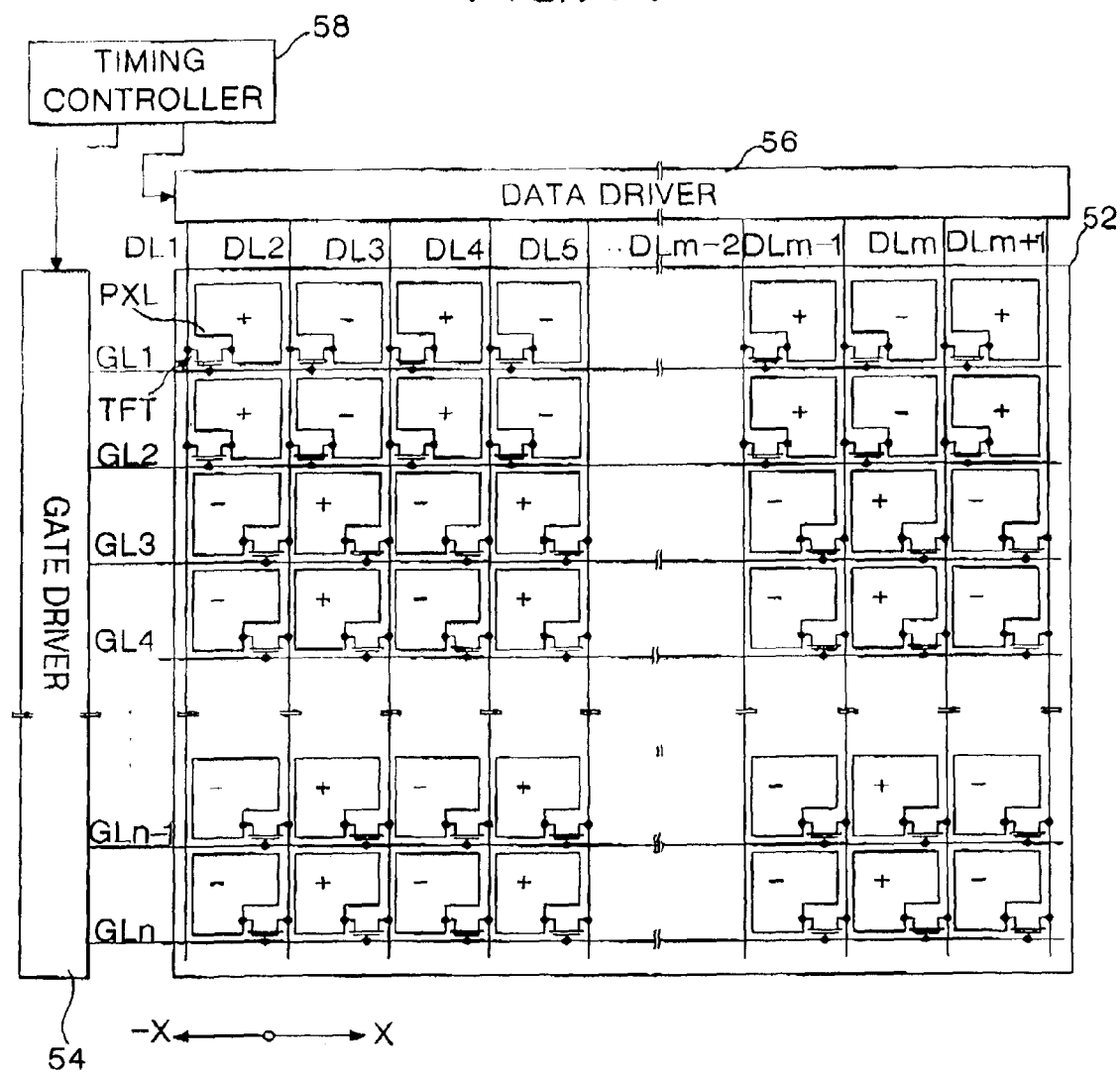
FIG. 11 a schematic view showing a configuration of a liquid crystal display for a vertical 2-dot inversion driving according to still another embodiment of the present invention.

Referring to FIG. 11, there is shown a liquid crystal display for a vertical two-dot inversion system driving according to another embodiment of the present invention.

The liquid crystal display, shown in FIG. 11, includes a liquid crystal display panel 52 having liquid crystal cells arranged in a matrix, a gate driver 54 for driving gate lines GL1 to GLn of the liquid crystal display panel 52, a data driver 56 for driving data lines DL1 to DLm+1 of the liquid crystal display panel 52, and a timing controller 58 for controlling the gate driver 54 and the data driver 56.

The liquid crystal display panel 52 includes N numbers of gate lines GL1 to GLn, and m+1 numbers of data lines DL1 to DLm+1 crossing the gate lines GL1 to GLn and insulated therefrom. The liquid crystal panel 52 includes a liquid crystal cell PXL and a thin film transistor TFT provided at each area defined by crossing between the gate lines GL1 to GLn and the data lines DL1 to DLm+1. The TFT supplies pixel signals to the liquid crystal cell PXL from the data lines DL1 to DLm+1 in response to scanning signals from the gate lines GL1 to GLn. In response to the pixel signal the liquid crystal cell controls light transmittance by driving liquid crystal located between the common and pixel electrodes (not shown).

Specifically, the thin film transistors and the liquid crystal cells PXL are arranged in a zigzag pattern, where they are located in turn by two horizontal lines, along the data line DL. In other words, the liquid crystal cells PXL and the TFTs included in the same column are alternately connected to one of two adjacent data lines by two horizontal lines.

For instance, the TFTs and the liquid crystal cells PXL on the $(4k-3)^{th}$ (herein, k is positive number) and $(4k-2)^{th}$ horizontal lines connected to the $(4k-3)^{th}$ and $(4k-2)^{th}$ gate lines GL1, GL2, GL5, GL6, . . . are respectively connected to the 1st to mth data lines DL1 to DLm adjacent to the left side thereof in case of the liquid crystal display panel 52 shown in FIG. 11. Accordingly, the liquid crystal cells PXL on the $(4k-3)^{th}$ and $(4k-2)^{th}$ horizontal lines are charged with the pixel signal, via the TFT, from the data lines DL to the left thereof.

On the other hand, the TFTs and the liquid crystal cells PXL on the $(4k-1)^{th}$ and $(4k)^{th}$ horizontal lines connected to the $(4k-1)^{th}$ and $(4k)^{th}$ gate lines GL3, GL4, GL7, GL8, . . . are respectively connected to the 2nd to (m+1)th data lines DL2 to DLm+1 to the right thereof. Accordingly, the liquid crystal cells PXL on the $(4k-1)^{th}$ and $(4k)^{th}$ horizontal lines are charged with the pixel signal, via the TFT, from the data lines DL to the right thereof.

Figure 12:
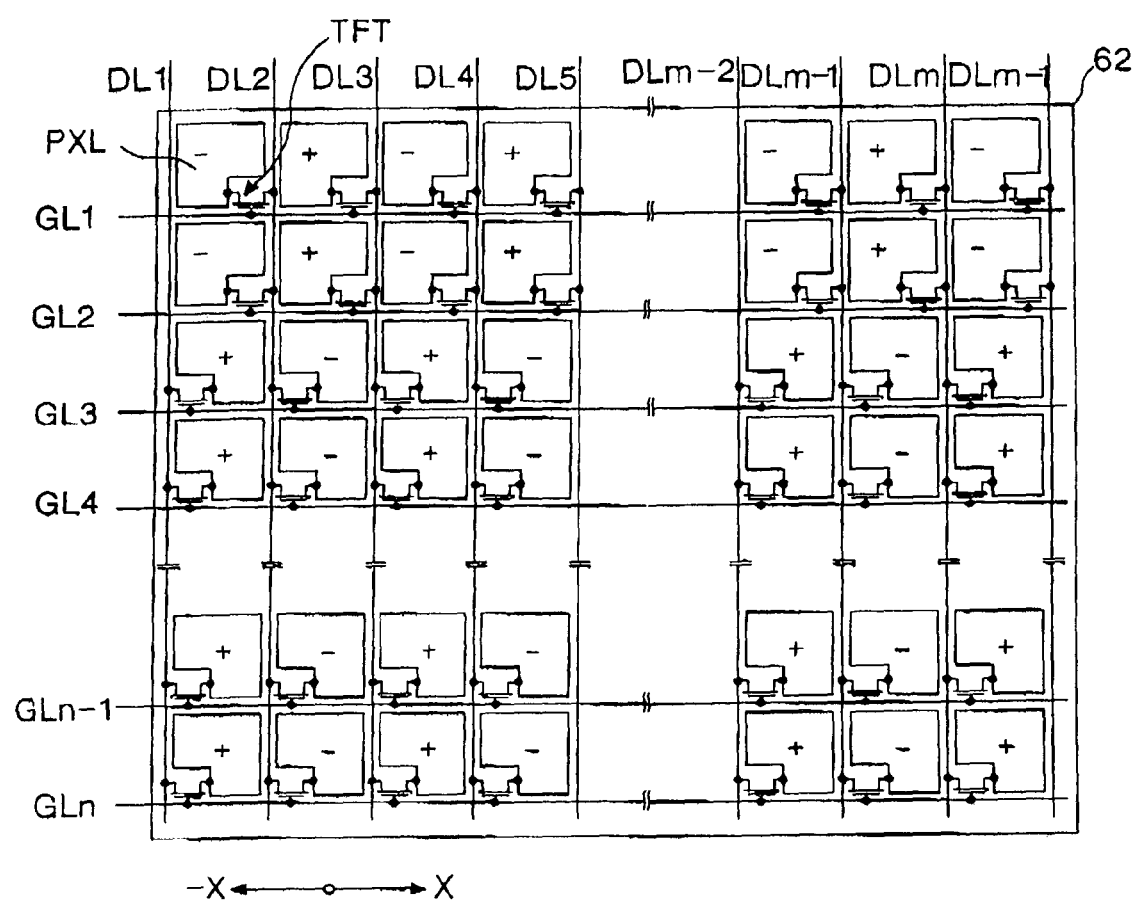
FIG. 12 is a schematic view showing still another configuration of the liquid crystal display panel applied to the present invention.

Otherwise, in the liquid crystal display panel 15 shown in FIG. 12, the TFTs and the liquid crystal cells PXL on the $(4k-3)^{th}$ and $(4k-2)^{th}$ horizontal lines connected to the $(4k-3)^{th}$ and $(4k-2)^{th}$ gate lines GL1, GL2, GL5, GL6, . . . are respectively connected to the 2nd to (m+1)th data lines DL2 to DLm+1 to the right thereof. Accordingly, the liquid crystal cells PXL on the $(4k-3)^{th}$ and $(4k-2)^{th}$ horizontal lines are charged with the pixel signal, via the TFT, from the data lines DL to the right thereof.

On the other hand, the TFTs and the liquid crystal cells PXL on the $(4k-1)^{th}$ and $(4k)^{th}$ horizontal lines connected to the $(4k-1)^{th}$ and $(4k)^{th}$ gate lines GL3, GL4, GL7, GL8, . . . are respectively connected to the 1st to mth data lines DL1 to DLm to the left thereof. Accordingly, the liquid crystal cells PXL on the $(4k-1)^{th}$ and $(4k)^{th}$ horizontal lines are charged with the pixel signal, via the TFT, from the data lines DL to the left thereof.

The timing controller 58 generates timing control signals that control the gate driver 54 and the data driver 56, and supplies pixel data signals to the data driver 56. Gate timing control signals generated at the timing controller 58 include a gate start pulse GSP, a gate shift clock signal GSC, and a gate output enable signal GOE, etc. Data timing control signals generated at the timing controller 58 include a source start pulse SSP, a source shift clock signal SSC, a source output enable signal SOE, and a polarity control signal POC, etc.

The gate driver 54 sequentially applies scanning signals to the gate lines GL1 to GLn according to the gate timing control signals. Accordingly, the gate driver 54 drives the thin film transistors by horizontal lines in response to the scanning signal.

The data driver 56 converts the pixel data into analog pixel signals to apply the pixel signals of one horizontal line to the data lines DL1 to DLm+1 by horizontal periods when a scanning signal is applied to the gate line GL. In this case, the data driver 56 converts the pixel data into pixel signals with the aid of gamma voltages from a gamma voltage generator (not shown).

Further, the data driver 56 applies the pixel signals according to a column inversion driving system in which the polarity of the pixel signal is inverted by data lines DL. In other words, the data driver 56 applies pixel signals with opposite polarity to the odd-numbered data lines DL1, DL3, . . . and the even-numbered data lines DL2, DL4, . . . , and the polarity of the pixel signal supplied to the data lines DL are inverted in consecutive frames.

In this case, because the liquid crystal cells PXL are alternately connected to the different data lines that are adjacent to each other depending on to which the data lines DL1 to DLm+1 the pixel signal is supplied in the column inversion system, the liquid crystal cells PXL are driven in the vertical two-dot inversion system.

Particularly, the data driver 56 alternately changes the output channel of the pixel signals by two horizontal periods to supply correct pixel signals to the liquid crystal cells PXL that are alternately changed along the data lines DL1 to DLm+1 by two horizontal lines.

In supplying pixel signals to the liquid crystal cells PXL connected to the data lines DL1 to DLm+1 to the right, the data driver 56 supplies m numbers of valid pixel signal to the m numbers of data lines DL1 to DLM and blank signals to the m+1 numbers of data lines DLm+1. Differently from this, in supplying pixel signals to the liquid crystal cells PXL connected to the data lines DL1 to DLm+1 to the left, the data driver 56 supplies m numbers of valid pixel signal to the 2 to m+1 numbers of data lines DL2 to DLm+1 by shifting them by one channel to the right side, and blank signals to the 1st data lines DL1.

For instance, when the liquid crystal cells PXL drives $(4k-3)^{th}$ and $(4k-2)^{th}$ horizontal lines connected to the data lines DL1 to DLm+1 to the right, as shown in FIG. 11, the data driver 56 supplies m numbers of valid pixel signals to the $1^{st}$ to $m^{th}$ data lines DL1 to DLm, and blank signals to the $(m+1)^{th}$ data line DLm+1 additionally. When the liquid crystal cells PXL drives $(4k-1)^{th}$ and $(4k)^{th}$ horizontal line connected to data lines DL1 to DLm+1 to the left, the data driver 56 supplies m numbers of valid pixel signals to the $2^{nd}$ to $(m+1)^{th}$ data lines DL2 to DLm+1 by shifting them by one channel the right, and blank signals to the $1^{st}$ data line.

Differently from this, when the liquid crystal cells PXL drives $(4k-3)^{th}$ and $(4k-2)^{th}$ horizontal line connected to the left side of the data lines DL1 to DLm+1, as shown in FIG. 12, the data driver 56 supplies m numbers of valid pixel signals to the $2^{nd}$ to $(m+1)^{th}$ data lines DL2 to DLm+1 by shifting them by one channel toward the right side, and blank signals to the $1^{st}$ data line. And, when the liquid crystal cells PXL drives $(4k-1)^{th}$ and $(4k)^{th}$ horizontal line connected to the left side of the data lines DL1 to DLm+1, the data driver 56 supplies m numbers of valid pixel signals to the $1^{st}$ to $m^{th}$ data lines DL1 to DLm, and blank signals to the $(m+1)^{th}$ data line DLm+1 additionally.

The configuration of such data driver 56 is same as shown in FIG. 7. However, the only difference is that the MUX array 24 changes the channel of the pixel data by two horizontal periods. Because such data driver configuration has been described with respect to FIG. 7, a more detailed description of the configuration and operation is omitted.

Referring to FIG. 7, the latch array 22 latches and outputs the pixel data from the timing controller 58 in response to the sampling signal of the shift register array 20.

The MUX array 24 changes the route of the pixel data from the latch array 22 by two horizontal periods in response to the control signal from the timing controller 58. Particularly, the MUX array 24 outputs the inputted pixel data without the change of channel during $(4k-3)^{th}$ and $(4k-2)^{th}$ {or $(4k-1)^{th}$ and $(4k)^{th}$} horizontal period when driving the liquid crystal cells PXL connected to the right side of the data lines DL1 to DLm+1 and has blank data supplied to the last channel. Differently from this, the MUX array 24 outputs the inputted pixel data by shifting one channel to the right during $(4k-1)^{th}$ and $(4k)^{th}$ {or $(4k-3)^{th}$ and $(4k-2)^{th}$} horizontal period when driving the liquid crystal cells PXL connected to the left side of the data lines DL1 to DLm+1 and has blank data supplied to the first channel.

To achieve this, the control signal inputted to the MUX array 24 has its polarity inverted by two horizontal periods.

DAC array 26 converts the pixel data and blank data from the MUX array 24 to the pixel signal and the blank signal, which have their polarity opposite to the adjacent channel in response to the polarity control signal POL for column inversion, and outputs them.

The buffer array 28 supplies the pixel signals and blank signals from DAC array 26 to the data lines DL1 to DLm+1 respectively.

Accordingly, pixel signals and blank signals are supplied to the data lines DL1 to DLm+1. The polarity of the pixel and blank signals is inverted by data lines and by frames as shown in FIGS. 13A and 13B.

FIG. 13A and FIG. 13B represent pixel signals and blank signals supplied to the data lines DL1 to DLm+1 of the liquid crystal panel shown in FIG. 11 in the odd-numbered frame and the even-numbered frame, respectively.

Referring to FIG. 13A, in the odd-numbered frame in the $(4k-3)^{th}$ and $(4k-2)^{th}$ horizontal period, the pixel signals R, G and B of red, green and blue are supplied to the first to the $m^{th}$ data lines DL1 to DLm, and at the same time, the blank signals BK are supplied to the $(m+1)^{th}$ data line DLm+1; m/3 numbers each of the pixel signals R, G and B of red, green and blue are supplied to the second to the $(m+1)^{th}$ data lines DL2 to DLm+1, and at the same time, the blank signals BK are supplied to the first data line DL1 in the $(4k-1)^{th}$ and $(4k)^{th}$ horizontal period 2H, 3H, . . . , n−1H, nH.

During such odd-numbered frame interval, a pixel signal with positive polarity is always applied to the odd-numbered data lines DL1, DL3, . . . , DLm+1, and a pixel signal with negative polarity is always applied to the even-numbered data lines. Accordingly, the liquid crystal cells PXL, of which position is alternated at by two horizontal lines, is driven in the vertical two-dot inversion system.

Referring to FIG. 13B, in the even-numbered frame in the $(4k-3)^{th}$ and $(4k-2)^{th}$ horizontal period, the pixel signals R, G and B of red, green and blue are supplied to the second to the $(m+1)^{th}$ data lines DL2 to DLm+1, and at the same time, the blank signals BK are supplied to the first data line DL1; m/3 numbers each of the pixel signals R, G and B of red, green and blue are supplied to the first to the $m^{th}$ data lines DL1 to DLm, and at the same time, the blank signals BK are supplied to the $(m+1)$th data line DLm+1 in the $(4k-1)^{th}$ and $(4k)^{th}$ horizontal period 2H, 3H, . . . , n−1H, nH.

During such even-numbered frame interval, contrary to the above odd-numbered frame, a pixel signal with negative polarity is always applied to the odd-numbered data lines DL1, DL3, . . . , DLm+1, and a pixel signal with positive polarity is always applied to the even-numbered data lines. Accordingly, the liquid crystal cells PXL, of which position is alternated by two horizontal lines, is driven in the vertical two-dot inversion system.

Figure 14:
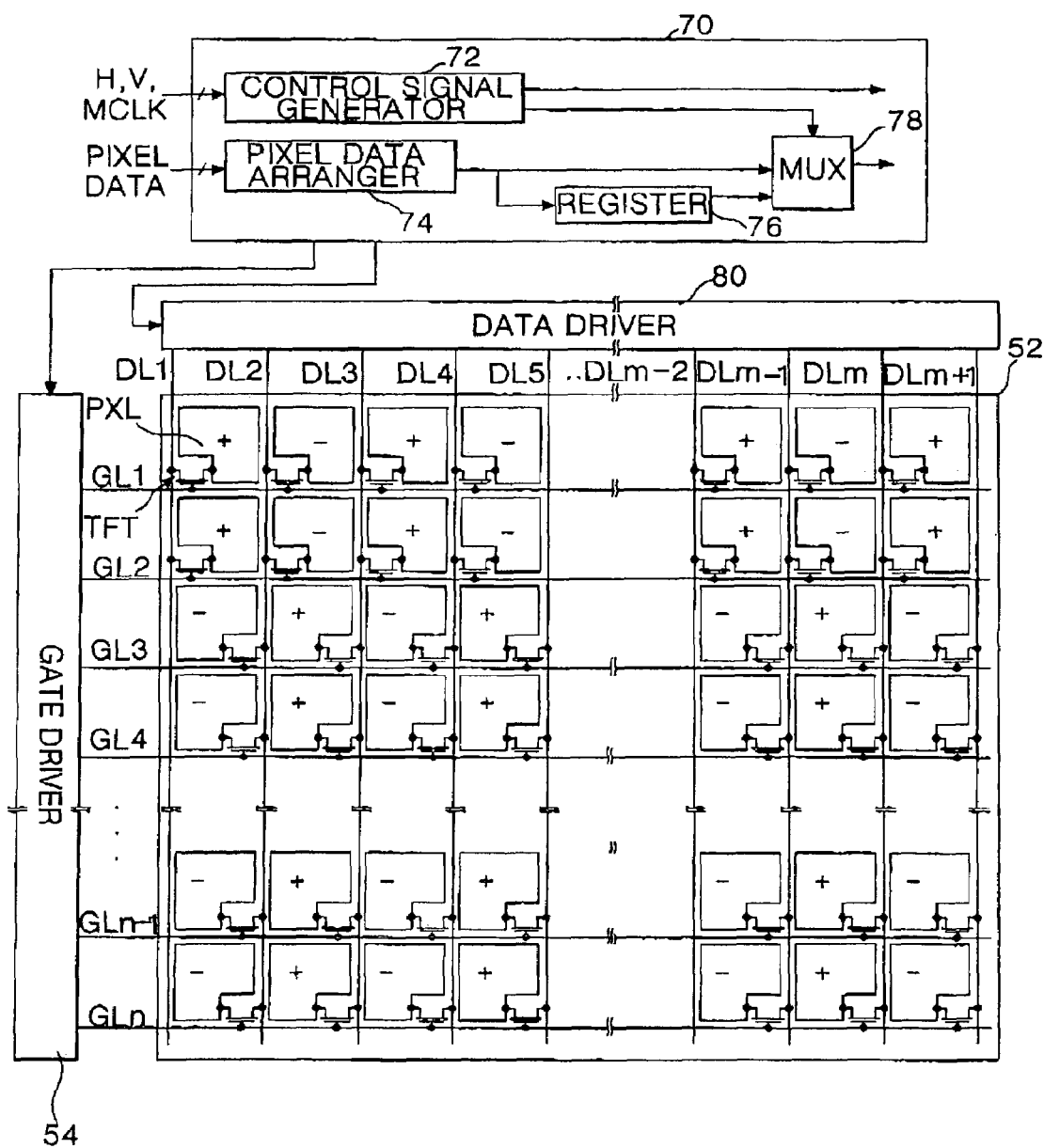
FIG. 14 is a schematic view showing a configuration of a liquid crystal display for a vertical 2-dot inversion driving according to still another embodiment of the present invention.

FIG. 14 represents a liquid crystal display for the vertical two-dot inversion according to another embodiment of the present invention.

The liquid crystal display, shown in FIG. 14, has the same elements as the liquid crystal display, shown in FIG. 11, except that there is difference in the function of the timing controller 70 and the data driver 80.

The liquid crystal display panel 52 has the liquid crystal cells PXL and the TFTs provided at each area defined by crossings between the gate lines GL1 to GLn and the data lines DL1 to DLm+1 to be arranged in a matrix pattern.

The TFTs and the liquid crystal cells PXL are arranged in a zigzag pattern, where their position takes turns right to left or vice versa by two horizontal lines, along the data lines DL1 to DLm+1. In other words, the liquid crystal cells and TFTs included in the same column are alternately connected to other adjacent data lines by two horizontal lines.

For instance, the liquid crystal cells PXL and the TFTs of the $(4k-3)^{th}$ and $(4k-2)^{th}$ {or $(4k-1)^{th}$ and $(4k)^{th}$} horizontal lines connected to the $(4k-3)^{th}$ and $(4k-2)^{th}$ {or $(4k-1)^{th}$ and $(4k)^{th}$} gate lines, are respectively connected to the $1^{st}$ to $m^{th}$ data lines DL1 to DLm adjacent to the left thereof. Accordingly, the liquid crystal cells PXL of the $(4k-3)^{th}$ and $(4k-2)^{th}$ {or $(4k-1)^{th}$ and $(4k)^{th}$} horizontal lines are charged via the TFTs with the pixel signal from the data line DL to the left thereof.

On the other hand, the liquid crystal cells PXL and the TFTs of the $(4k-1)^{th}$ and $(4k)^{th}$ {or $(4k-3)^{th}$ and $(4k-2)^{th}$} horizontal lines connected to the $(4k-1)^{th}$ and $(4k)^{th}$ {or $(4k-3)^{th}$ and $(4k-2)^{th}$} gate lines, are respectively connected to the $2^{nd}$ to $(m+1)^{th}$ data lines DL2 to DLm+2 to the right thereof. Accordingly, the liquid crystal cells PXL of the $(4k-1)^{th}$ and $(4k)^{th}$ {or $(4k-3)^{th}$ and $(4k-2)^{th}$} horizontal lines are charged with, through the TFT's, the pixel signal from the data line DL adjacent to the right side thereof.

The gate driver 54 sequentially applies scanning signals to the gate lines GL1 to GLn according to gate timing control signals from the timing controller 70.

The data driver 80 converts the inputted pixel data into analog pixel signals to apply the pixel signals of one horizontal line to the data lines DL1 to DLm+1 by horizontal periods when the scanning signals are applied to the gate line GL. In this case, the data driver 80 converts the pixel data into pixel signals with the aid of gamma voltages from a gamma voltage generator (not shown).

Further, the data driver 80 applies the pixel signals by the column inversion driving system where the pixel signals are inverted by data lines DL1 to DLm+1. In other words, the data driver 80 applies pixel signals with a opposite polarity to the odd-numbered data lines DL1, DL3, . . . and the even-numbered data lines DL2, DL4, . . . . The polarity of the pixel signals supplied to the data lines DL1 to Dlm+1 is inverted in consecutive frames. In this case, because the liquid crystal cells PXL are connected to different adjacent data lines while being alternated by two horizontal lines on the basis of the data lines DL1 to DLm+1 to which the pixel signals are supplied in the column inversion driving system, the liquid crystal cells are driven by the vertical two-dot inversion system.

Specifically, to supply accurate pixel signals to the liquid crystal cells PXL arranged in the zigzag pattern along the data lines DL1 to DLm+1, the data driver 80 supplies the blank signals to the $1^{st}$ data line DL1 and the valid pixel signals to the $2^{nd}$ to $(m+1)^{th}$ data lines DL2 to DLm+1 in the $(4k-3)^{th}$ and $(4k-2)^{th}$ {or $(4k-1)^{th}$ and $(4k)^{th}$} horizontal period. The valid pixel signals are supplied to the $1^{st}$ to $m^{th}$ data lines DL1 to DLm, and the blank signals to the $(m+1)^{th}$ data line DLm+1 in the $(4k-11)^{th}$ and $(4k)^{th}$ {or $(4k-3)^{th}$ and $(4k-2)^{th}$} horizontal period.

The timing controller 70 generates control signals for controlling driving of the gate driver 54 and the data driver 80, and applies pixel data to the data driver 80.

Gate timing control signals generated at the timing controller 70 includes gate start pulse GSP, gate shift clock signal GSC, and gate output enable signal GOE, etc. The data timing control signals generated at the timing controller 70 includes source start pulse SSP, source shift clock signal SSC, source output enable signal SOE, polarity control signal POL and etc.

Particularly, the timing controller 70 supplies m numbers of pixel data of one horizontal line sequentially by a certain unit in the $(4k-3)^{th}$ and $(4k-2)^{th}$ {or $(4k-1)^{th}$ and $(4k)^{th}$} horizontal period, and additionally the blank data are supplied as $(m+1)^{st}$ pixel data. In the $(4k-1)^{th}$ and $(4k)^{th}$ {or $(4k-3)^{th}$ and $(4k-2)^{th}$} horizontal period, the m numbers of pixel data are supplied with delay by one channel and additionally blank signals are supplied as the first pixel data.

For the sake of such a driving, the timing controller 70 includes a control signal generator 72 for generating control signals, a pixel data arranger 74 for arranging and outputting input pixel data, a register 76 for delaying the last pixel data of the pixel data outputted from the pixel data arranger 74, and a MUX 78 for selectively combining the pixel data from the pixel data arranger 74 and the pixel data delayed from the register 76.

The control signal generator 72 generates gate timing control signals for controlling the gate driver 54 and data timing control signals for controlling the data driver 80 in use of horizontal synchronization signal H, vertical synchronization signal 9, main clock signal MCLK etc. Further, the control signal generator 72 generates a MUX 78 control signal. In this case, the control signal generator 72, in use of the horizontal synchronization signal H, generates the control signal indicating the $(4k-3)^{th}$ and $(4k-2)^{th}$ horizontal period and the $(4k-1)^{th}$ and $(4k)^{th}$ horizontal period. That is, the polarity of the control signal is inverted for two horizontal periods so as to supply it to the MUX 78.

The pixel data arranger 74 arranges input pixel data and outputs them depending upon a data transmission bus hierarchy. For instance, the pixel data arranger 74 simultaneously outputs the pixel data of R, G and B through three buses, or simultaneously outputs the pixel data of odd-numbered R, G and B and the pixel data of even-numbered R, G and B through six buses. The pixel data outputted through the other buses excluding the last bus among such buses are supplied to the MUX 78, and the pixel data outputted through the last bus are commonly supplied to the MUX 78 and the register 76. Also, the pixel data arranger 74 takes samples of the blank data BK in a blank interval between data enable intervals to output in the data enable interval.

The register 76 temporarily stores the pixel data transmitted via the last bus of the pixel data outputted from the pixel data arranger 74, and delays them by one channel.

The MUX 78 outputs m numbers of the pixel data and the blank data, $(m+1)^{th}$ data, inputted through three buses or six buses from the pixel data arranger 74 in the $(4k-3)^{th}$ and $(4k-2)^{th}$ {or $(4k-1)^{th}$ and $(4k)^{th}$} horizontal period in response to the control signal.

Also, in response to the control signal, MUX 78 shifts the pixel data inputted from the pixel data arranger 74 to output, via the first or the second bus, to the second or the third bus in $(4k-1)^{th}$ and $(4k)^{th}$ {or $(4k-3)^{th}$ and $(4k-2)^{th}$} horizontal period. Otherwise, it shifts to output the pixel data inputted through the first to the fifth bus to the second to sixth bus. The register 76 delays the pixel data of the last bus by one channel. That is, the third or the sixth bus is output to the first bus. In this case, the blank data stored at the register 46 during the blank interval are supplied as the first data of the first bus in the $(4k-1)^{th}$ and $(4k)^{th}$ {or $(4k-3)^{th}$ and $(4k-2)^{th}$} horizontal interval.

In the timing controller 70 with such a configuration, the pixel data and the blank data supplied to the data driver 80 through the third or the sixth bus in the $(4k-3)^{th}$ and $(4k-2)^{th}$ {or $(4k-1)^{th}$ and $(4k)^{th}$} horizontal period and the $(4k-1)^{th}$ and $(4k)^{th}$ {or $(4k-3)^{th}$ and $(4k-2)^{th}$} horizontal period, are same as in the foregoing FIGS. 9A to 9B.

Referring to FIG. 9A, in the $(4k-3)^{th}$ and $(4k-2)^{th}$ {or $(4k-1)^{th}$ and $(4k)^{th}$} horizontal period, the timing controller 70 supplies one blank data BK and m/3 numbers of red pixel data R1, R2, R3, . . . , Rm/3 via the first bus DB1 to the data driver 80; m/3 numbers of green pixel data G1, G2, G3, . . . , Gm/3 via the second bus DB2; and m/3 numbers of blue pixel data B1, B2, B3, . . . , Bm/3 via the third bus DB3. In this way, the timing controller 70 supplies m numbers of the valid pixel data R, G and B to the data driver 80 through the first to the third bus DB1 to DB3 during the enable interval of the data enable signal DE. The timing controller 70 supplies the blank data BK sequentially following the enable period.

Accordingly, the data driver 80 inputs one blank data BK and m numbers of valid pixel data R, G and B. And the data driver 80 converts the m numbers of valid pixel data R, G and B to the analog pixel signal to supply to the first to $m^{th}$ data lines DL1 to DLm and at the same time converts one blank data BK to the analog blank signal to supply to the $(m+1)^{th}$ data line DLm+1.

Referring to FIG. 9B, in the $(4k-1)^{th}$ and $(4k)^{th}$ {or $(4k-3)^{th}$ and $(4k-2)^{th}$} horizontal period, the timing controller 70 supplies m/3 numbers of red pixel data R1, R2, R3, . . . , Rm/3 to the data driver 80 by shifting them to the second bus DB2; and m/3 numbers of green pixel data G1, G2, G3, . . . , Gm/3 by shifting them to the third bus DB3. The timing controller 70 supplies to the data driver 80, via the first bus DB1, m/3 numbers of blue pixel data B1, B2, B3, . . . , Bm/3 and one blank data BK delayed by one channel. In this way, the timing controller 70 supplies one blank data BK and m−1 numbers of the valid pixel data R, G and B, which is shifted by one channel, to the data driver 80 through the first to the third bus DB1 to DB3 during the enable interval of the data enable signal DE. And the timing controller 70 further supplies the last valid pixel data Dm/3, which is shifted by one channel, sequentially following the enable period.

Accordingly, the data driver 80 inputs one blank data BK and m numbers of valid pixel data R, G and B. The data driver 80 converts the inputted m numbers of valid pixel data R, G and B, which is shifted by one channel, to the analog pixel signal to supply to the second to $(m+1)^{th}$ data lines DL2 to DLm+2 and at the same time converts one blank data BK to the analog blank signal to supply to the first data line DL1.

Referring to FIG. 10A, in the $(4k-3)^{th}$ and $(4k-2)^{th}$ {or $(4k-1)^{th}$ and $(4k)^{th}$} horizontal period, the timing controller 70 supplies one blank data BK and m/6 numbers of odd-numbered red pixel data OR1, OR2, OR3, . . . , ORm/6 via the first bus DB1 to the data driver 80, m/6 numbers of odd-numbered green pixel data OG1, OG2, OG3, . . . , OGm/6 via the second bus DB2, m/6 numbers of odd-numbered blue pixel data OB1, OB2, OB3, . . . , OBm/6 via the third bus DB3, m/6 numbers of even-numbered red pixel data ER1, ER2, ER3, . . . , ERm/6 via the fourth bus DB4, m/6 numbers of even-numbered green pixel data EG1, EG2, EG3, . . . , EGm/6 via the fifth bus DB5, and m/6 numbers of even-numbered blue pixel data EB1, EB2, EB3, . . . , EBm/6 via the sixth bus DB6.

In this way, the timing controller 70 supplies m numbers of the valid pixel data R, G and B to the data driver 80 through the first to the sixth bus DB1 to DB6 during the enable interval of the data enable signal DE. The timing controller 70 supplies the blank data BK sequentially following the enable period.

Accordingly, the data driver 80 inputs one blank data BK and m numbers of valid pixel data R, G and B. The data driver 80 converts the m numbers of valid pixel data R, G and B to the analog pixel signal to supply to the first to $m^{th}$ data lines DL1 to DLm and at the same time converts one blank data BK to the analog blank signal to supply to the $(m+1)^{th}$ data line DLm+1.

Referring to FIG. 10B, in the $(4k-1)^{th}$ and $(4k)^{th}$ {or $(4k-3)^{th}$ and $(4k-2)^{th}$} horizontal period, the timing controller 70 supplies m/6 numbers of odd-numbered red pixel data OR1, OR2, OR3, . . . , ORm/6 to the data driver 80 by shifting them to the second bus DB2, m/6 numbers of odd-numbered green pixel data OG1, OG2, OG3, . . . , OGm/3 to the third bus DB3, m/6 numbers of odd-numbered blue pixel data OB1, OB2, OB3, . . . , OBm/6 to the fourth bus DB4, m/6 numbers of even-numbered red pixel data ER1, ER2, ER3, . . . , ERm/6 to the fifth bus DB5, m/6 numbers of even-numbered green pixel data EG1, EG2, EG3, . . . , EGm/6 to the sixth bus DB6.

The timing controller 70 supplies to the data driver 80, via the first bus DB1, m/6 numbers of even-numbered blue pixel data EB1, EB2, EB3, . . . , EBm/6 and one blank data BK delayed by one channel. In this way, the timing controller 70 supplies one blank data BK, which is shifted by one channel, and m−1 numbers of the valid pixel data R, G and B to the data driver 80 through the first to the sixth bus DB1 to DB6 during the data enable interval. The timing controller 70 further supplies the last valid pixel data Dm/6, which is shifted by one channel, sequentially following the enable period.

Accordingly, the data driver 80 inputs one blank data BK and m numbers of valid pixel data R, G and B shifted by one channel. The data driver 80 converts the inputted m numbers of valid pixel data R, G and B, which is shifted by one channel, to the analog pixel signal to supply to the second to $(m+1)^{th}$ data lines DL2 to DLm+2 and at the same time converts one blank data BK to the analog blank signal to supply to the first data line DL1.

Likewise, blank data are supplied, of the first or the last pixel data, along with the m numbers of valid pixel data by two horizontal periods in the timing controller 70. The data driver 80 converts m numbers of valid pixel data and one blank data to pixel signals and blank signals of the column inversion system, to supply them to the liquid crystal panel 52. As a result, the liquid crystal panel 52 is driven in the vertical two-dot inversion system.

On the other hand, in the embodiments of the present invention, there is explained only the case that the liquid crystal cells are alternately connected to the adjacent data lines different from each other by horizontal lines or by two horizontal lines, however, it is possible that they are alternately connected to one another by three horizontal lines or by more horizontal lines.

As described above, the liquid crystal display according to the present invention has the liquid cells alternately connected to the adjacent data lines different from each other by i('i' is a positive number) horizontal lines along the data line to be arranged in an alternating or zigzag pattern. Consequently, the liquid crystal display according to the present invention supplies the pixel signal of which the polarity is determined by the column inversion system to make liquid crystal cells able to be driven in i-dot inversion system. Also, the liquid crystal display according to the present invention supplies the blank signal as the first or the last pixel data together with the m numbers of valid pixel signals every i horizontal period to make the correct pixel signal delivered to the liquid crystal cells arranged along the line in zigzag type.

As a result, the liquid crystal display according the present invention is capable of not only remarkably reducing its power consumption compared to i-dot inversion system, but also increasing its picture quality because it drives in the i-dot inversion system with the power consumption of the column inversion system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
    a liquid crystal display panel having a plurality of liquid crystal cells arranged at crossings of gate lines and data lines, wherein a first pair of thin film transistors and a second pair of thin film transistors along a given column are alternately connected to adjacent data lines every 'i' number of horizontal lines, wherein i is a positive number;
    a gate driver for driving the gate lines; and
    a data driver for driving the data lines, the data driver comprising a multiplexor array for determining an output channel of an inputted pixel data and for adding one blank data in response to the control signals having polarity that is inverted every 'i' number of horizontal lines, and a digital-analog converter array for converting the pixel data and the blank data to a pixel signal and a blank signal having a polarity is that inverted according to the data lines and frames;
    wherein a first horizontal line and a second horizontal line are alternately arranged within the liquid crystal display panel and each include at least two horizontal rows of liquid crystal cells.

2. The liquid crystal display according to claim 1, wherein the liquid crystal display panel includes:
    the first horizontal line of liquid crystal cells connected to the data lines arranged adjacent to and on the left side of the liquid crystal cells within the first horizontal line; and
    the second horizontal line of the liquid crystal cells connected to the data lines arranged adjacent to and on right side of the liquid crystal cells within the second horizontal line.

3. The liquid crystal display according to claim 2, wherein the multiplexor array maintains an output channel from the pixel data as an input channel, supplies the blank data to the last output channel during a first horizontal period when the first horizontal line is driven, and shifts the pixel data by one channel to the shifted pixel data to the output channel and supplies the blank data to the first output channel during a second horizontal period when the first horizontal line is driven.

4. The liquid crystal display according to claim 1, wherein the data driver further includes:
    a shift register array for supplying a sequential sampling signal;
    a latch array for sequentially latching the pixel data by a predetermined number of channels in accordance with the sampling signal and for outputting and supplying the pixel data to the multiplexor array; and
    a buffer array for buffering the pixel signal and the blank signal from the digital-analog converter array and for supply the pixel signal and the blank signal to the data lines.

5. A liquid crystal display, comprising:
    a liquid crystal display panel having a plurality of liquid crystal cells arranged at crossings of gate lines and data lines, wherein a first pair of thin film transistors and a second pair of thin film transistors along a given column are alternately connected to adjacent data lines every 'i' number of horizontal lines, wherein i is a positive number;
    a gate driver for driving the gate lines;
    a data driver for converting an inputted pixel data and a blank data into pixel signals and blank signals having polarity that is inverted according to the data line and the frame and for supplying the pixel signals and blank signals to the data lines; and
    a timing controller for controlling the gate driver and the data driver and for adding the blank data to one of a first channel or a last channel with the pixel data to supply to the data driver in response to the control signal having a polarity that is inverted according to the i number of horizontal lines;
    wherein the first horizontal line and the second horizontal line are alternately arranged within the liquid crystal display panel and each include at least two horizontal rows of liquid crystal cells.

6. The liquid crystal display according to claim 5, wherein the liquid crystal display panel includes:
    the first horizontal line of liquid crystal cells connected to the data lines arranged adjacent to and on the left side of the liquid crystal cells within the first horizontal line; and
    the second horizontal line of liquid crystal cells connected to the data lines arranged adjacent to and on the right side of the liquid crystal cells within the second horizontal line.

7. The liquid crystal display according to claim 6, wherein the timing controller supplies the pixel data and the blank data added as a last channel to the data driver in a first horizontal period when the first horizontal line is driven, and supplies the pixel data delayed by one channel and the blank data added to the first channel to the data driver in a second horizontal period when the second horizontal line is driven.

8. The liquid crystal display according to claim 6, wherein the timing controller includes:
    a control signal generator for generating control signals capable of controlling the gate driver and the data driver and for generating control signals having polarity that is inverted according to the i horizontal line;

a pixel data arranger for arranging inputted pixel data to output through a plurality of first buses during a data enable period, and for supplying the blank data through the first buses;

a delayer for delaying the pixel data and the blank data transmitted through a last bus among the first buses; and a multiplexor for supplying, via a plurality of second buses, the blank data and the data inputted through the first buses in-situ in response to the control signal or combining the pixel data inputted through the first buses with the blank data delayed to supply through the second buses.

9. The liquid crystal display according to claim 8, wherein the multiplexor supplies, via the second bus, the blank data and the pixel data inputted through the first buses in a first horizontal period for driving the first horizontal line in-situ and in a second horizontal period for driving the second horizontal line, for shifting the pixel data inputted through the first buses, except the last one of the first buses, by one channel to supply through the second buses, except the first one of the second buses, and for supplying the pixel data and the blank data delayed by one channel through the first one of the second buses.

* * * * *